(12) United States Patent
Longdale et al.

(10) Patent No.: US 10,608,974 B2
(45) Date of Patent: Mar. 31, 2020

(54) COMPUTER-BASED AUTHORING TOOL FOR NARRATIVE CONTENT DELIVERED BY AN INTERACTIVE MESSAGE-BASED DELIVERY SYSTEM

(71) Applicant: LiveTales LLC, San Diego, CA (US)

(72) Inventors: Holly Gyda Longdale, San Diego, CA (US); Terence John Michaels, Fallbrook, CA (US); Justin Dazet, San Diego, CA (US); David Eugene Kish, Escondido, CA (US)

(73) Assignee: Daybreak Game Company LLC, San Diego, CA (US)

( * ) Notice: Subject to any disclaimer, the term of this patent is extended or adjusted under 35 U.S.C. 154(b) by 15 days.

(21) Appl. No.: 15/485,103

(22) Filed: Apr. 11, 2017

(65) Prior Publication Data

US 2017/0337164 A1    Nov. 23, 2017

Related U.S. Application Data

(60) Provisional application No. 62/337,610, filed on May 17, 2016.

(51) Int. Cl.
*G06F 17/00* (2019.01)
*H04L 12/58* (2006.01)
(Continued)

(52) U.S. Cl.
CPC .............. *H04L 51/18* (2013.01); *A63F 13/35* (2014.09); *A63F 13/47* (2014.09); *A63F 13/60* (2014.09);
(Continued)

(58) Field of Classification Search
CPC .............................. A63F 13/69; G06F 17/2235
(Continued)

(56) References Cited

U.S. PATENT DOCUMENTS 7,225,233 B1    5/2007 Fenton
2007/0204211 A1*  8/2007 Paxson ............... G06F 17/2229
                                                     715/205
(Continued)

FOREIGN PATENT DOCUMENTS

EP          2493140 A1    8/2012
WO    WO 2014/027103 A1   2/2014

OTHER PUBLICATIONS

Laura Hudson, "I've been texting with an astronaut", published Apr. 15, 2016 via Wayback, pp. 1-9 (pdf).*

(Continued)

*Primary Examiner* — Manglesh M Patel
(74) *Attorney, Agent, or Firm* — Lorenz & Kopf, LLP

(57) ABSTRACT

A computer-based system maintains and provides a graphical authoring tool on a display device that enables a user to create a narrative storyline for uploading to a database system. The authoring tool operates to receive text content for a first passage of the narrative storyline, and text content for a second passage of the narrative storyline, establish a link from the first passage to the second passage, and assign user personality trait characteristics to the link. The trait characteristics influence personality trait profiles maintained by the database system for readers of the narrative storyline when the readers select the link to obtain the second passage. The authoring tool operates to upload the narrative storyline data from the computer-based system to the database system. The uploaded data includes the text content for the passages, the link, and the user personality trait characteristics assigned to the link.

10 Claims, 20 Drawing Sheets

(51) Int. Cl.
  *A63F 13/47* (2014.01)
  *H04L 29/08* (2006.01)
  *A63F 13/67* (2014.01)
  *A63F 13/35* (2014.01)
  *A63F 13/63* (2014.01)
  *G06F 40/134* (2020.01)
  *G06F 40/166* (2020.01)
  *H04L 29/06* (2006.01)
  *A63F 13/60* (2014.01)
  *G06F 3/0484* (2013.01)

(52) U.S. Cl.
  CPC .............. *A63F 13/63* (2014.09); *A63F 13/67* (2014.09); *G06F 40/134* (2020.01); *G06F 40/166* (2020.01); *H04L 51/02* (2013.01); *H04L 51/046* (2013.01); *H04L 51/16* (2013.01); *H04L 65/403* (2013.01); *H04L 67/02* (2013.01); *H04L 67/025* (2013.01); *H04L 67/18* (2013.01); *H04L 67/20* (2013.01); *H04L 67/306* (2013.01); *A63F 2300/407* (2013.01); *A63F 2300/537* (2013.01); *A63F 2300/5506* (2013.01); *A63F 2300/5533* (2013.01); *A63F 2300/572* (2013.01); *A63F 2300/6009* (2013.01); *A63F 2300/632* (2013.01); *A63F 2300/807* (2013.01); *G06F 3/04842* (2013.01); *H04L 51/32* (2013.01); *H04L 67/12* (2013.01)

(58) Field of Classification Search
  USPC ................................ 715/208, 200, 202, 255
  See application file for complete search history.

(56) References Cited

U.S. PATENT DOCUMENTS

| | | |
|---|---|---|
| 2008/0269919 A1 | 10/2008 | Nissen et al. |
| 2011/0107217 A1 | 5/2011 | Schwarz |
| 2012/0094768 A1 | 4/2012 | McCaddon et al. |
| 2013/0179803 A1 | 7/2013 | Melet |
| 2015/0004591 A1 | 1/2015 | Lidey et al. |
| 2015/0221169 A1* | 8/2015 | Filipour .............. G07F 17/3244 463/25 |
| 2015/0258454 A1* | 9/2015 | King ...................... A63F 13/47 463/31 |
| 2015/0375115 A1 | 12/2015 | Bunting et al. |

OTHER PUBLICATIONS

Kriegel Michael et al., An Authoring Tool For An Emergent Narrative Storytelling System, published 2007, aaai.org, pp. 1-8 (pdf).*

Lifeline Mobile App, Available for Download from the iTunes website as of Feb. 16, 2017 at https://itunes.apple.com/us/app/lifeline . . . /id982354972?mt=8.

* cited by examiner

COMPUTER-BASED AUTHORING TOOL FOR NARRATIVE CONTENT DELIVERED BY AN INTERACTIVE MESSAGE-BASED DELIVERY SYSTEM

CROSS-REFERENCE TO RELATED APPLICATION

This application claims the benefit of U.S. provisional patent application No. 62/337,610, filed May 17, 2016.

TECHNICAL FIELD

Embodiments of the subject matter described herein relate generally to entertainment and media delivery services. More particularly, embodiments of the subject matter relate to techniques, systems, and technologies that provide an interactive message-based narrative entertainment service to users of electronic devices.

BACKGROUND

The prior art is replete with video games, mobile apps, messaging services, social media platforms, and the like. These, and other conventional systems and methodologies, can be utilized to deliver various forms of entertainment and content to end users. Narrative video games, electronic books, video clips, and other content can be delivered from a service provider to users of electronic devices on demand if so desired. Ideally, dynamic and interactive content should engage end users, keep their attention, and represent good consumer value.

Accordingly, it is desirable to have an interactive message-based service that delivers on-demand entertainment (such as narrative stories) to end users. Furthermore, other desirable features and characteristics will become apparent from the subsequent detailed description and the appended claims, taken in conjunction with the accompanying drawings and the foregoing technical field and background.

BRIEF SUMMARY

A method of delivering storyline content to users is presented here. An exemplary embodiment of the method maintains storyline data corresponding to an interactive narrative storyline having variable narrative paths that influence at least one outcome of the interactive narrative storyline. A server system is used to communicate a storyline message using a messaging service, the communicated storyline message intended for a subscriber device, and the communicated storyline message including a portion of the interactive narrative storyline. The server system receives a response message generated from the subscriber device in response to the communicated storyline message, wherein the response message includes a user-specified storyline option. The server system retrieves the next storyline message, which has a subsequent portion of the interactive narrative storyline that is dictated by the user-specified storyline option. Thereafter, the server system communicates the next storyline message using the messaging service. The next storyline message is intended for the subscriber device.

Also disclosed here is a computer-based server system having a memory element and a processor device communicatively coupled to the memory element. The memory element has computer executable instructions stored thereon and configurable to be executed by the processor to cause the server system to: maintain storyline data corresponding to an interactive narrative storyline comprising variable narrative paths that influence at least one outcome of the interactive narrative storyline; communicate a storyline message using a messaging service, the communicated storyline message intended for a subscriber device, and the communicated storyline message including a portion of the interactive narrative storyline; receive a response message generated from the subscriber device in response to the communicated storyline message, the response message including a user-specified storyline option; retrieve a next storyline message comprising a subsequent portion of the interactive narrative storyline, the retrieving dictated by the user-specified storyline option; and after retrieving the next storyline message, communicate the next storyline message using the messaging service, the communicated next storyline message intended for the subscriber device.

Another method of delivering storyline content to users is also presented here. The method maintains, by a server system, storyline data corresponding to an interactive narrative storyline including variable narrative paths that influence at least one outcome of the interactive narrative storyline. The method continues by communicating storyline messages from the server system to a plurality of subscriber devices associated with a plurality of different users, each communicated storyline message comprising a portion of the interactive narrative storyline and a plurality of candidate storyline options. The server system receives response messages generated from at least two of the plurality of subscriber devices in response to the storyline messages, each received response message identifying one of the plurality of candidate storyline options, resulting in a plurality of identified candidate storyline options. The server system performs a statistical analysis on the plurality of identified candidate storyline options and retrieves the next storyline message with a subsequent portion of the interactive narrative storyline, wherein the retrieving is dictated by the statistical analysis performed on the plurality of identified candidate storyline options. Thereafter, the next storyline message is communicated from the server system using the messaging service, the communicated next storyline message intended for at least one of the plurality of subscriber devices.

Also presented here is an exemplary embodiment of a method for authoring narrative storyline content. The method involves: providing an authoring tool on a client device coupled to a database system; creating, by the authoring tool, a narrative storyline for uploading to the database system; receiving, by the authoring tool, text content for a first passage of the narrative storyline; receiving, by the authoring tool, text content for a second passage of the narrative storyline; establishing, by the authoring tool, a link from the first passage to the second passage; and assigning, by the authoring tool, user personality trait characteristics to the link. The user personality trait characteristics influence personality trait profiles maintained by the database system for readers of the narrative storyline when the readers select the link to obtain the second passage. The method continues by uploading data corresponding to the narrative storyline from the client device to the database system. The data includes the text content for the first passage, the text content for the second passage, the link, and the user personality trait characteristics assigned to the link.

Also presented here is an exemplary embodiment of a computer-based system having a memory element and a processor device communicatively coupled to the memory element, the memory element having computer executable instructions stored thereon and configurable to be executed by the processor to cause the computer-based system to: provide a graphical authoring tool on a display device of the computer-based system; create a narrative storyline for uploading to a database system; receive text content for a first passage of the narrative storyline, and text content for a second passage of the narrative storyline; establish a link from the first passage to the second passage; and assign user personality trait characteristics to the link. The user personality trait characteristics influence personality trait profiles maintained by the database system for readers of the narrative storyline when the readers select the link to obtain the second passage. The authoring tool can be manipulated to upload data corresponding to the narrative storyline from the computer-based system to the database system. The uploaded data includes the text content for the first passage, the text content for the second passage, the link, and the user personality trait characteristics assigned to the link.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

Figure 10B:
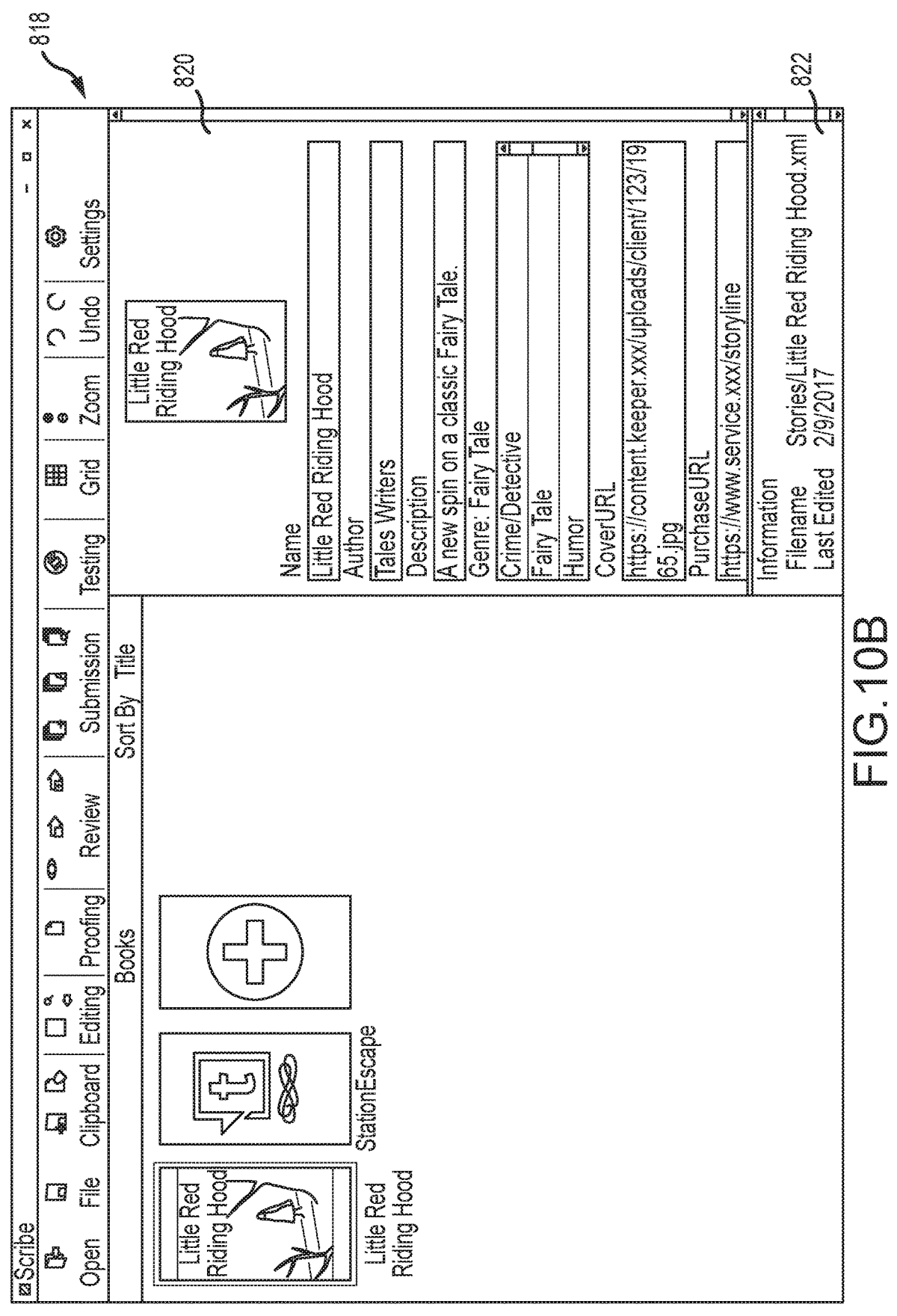

FIG. 10B is a simplified representation of another story interface screen generated by an exemplary embodiment of an authoring tool;

DETAILED DESCRIPTION

Figure 1:
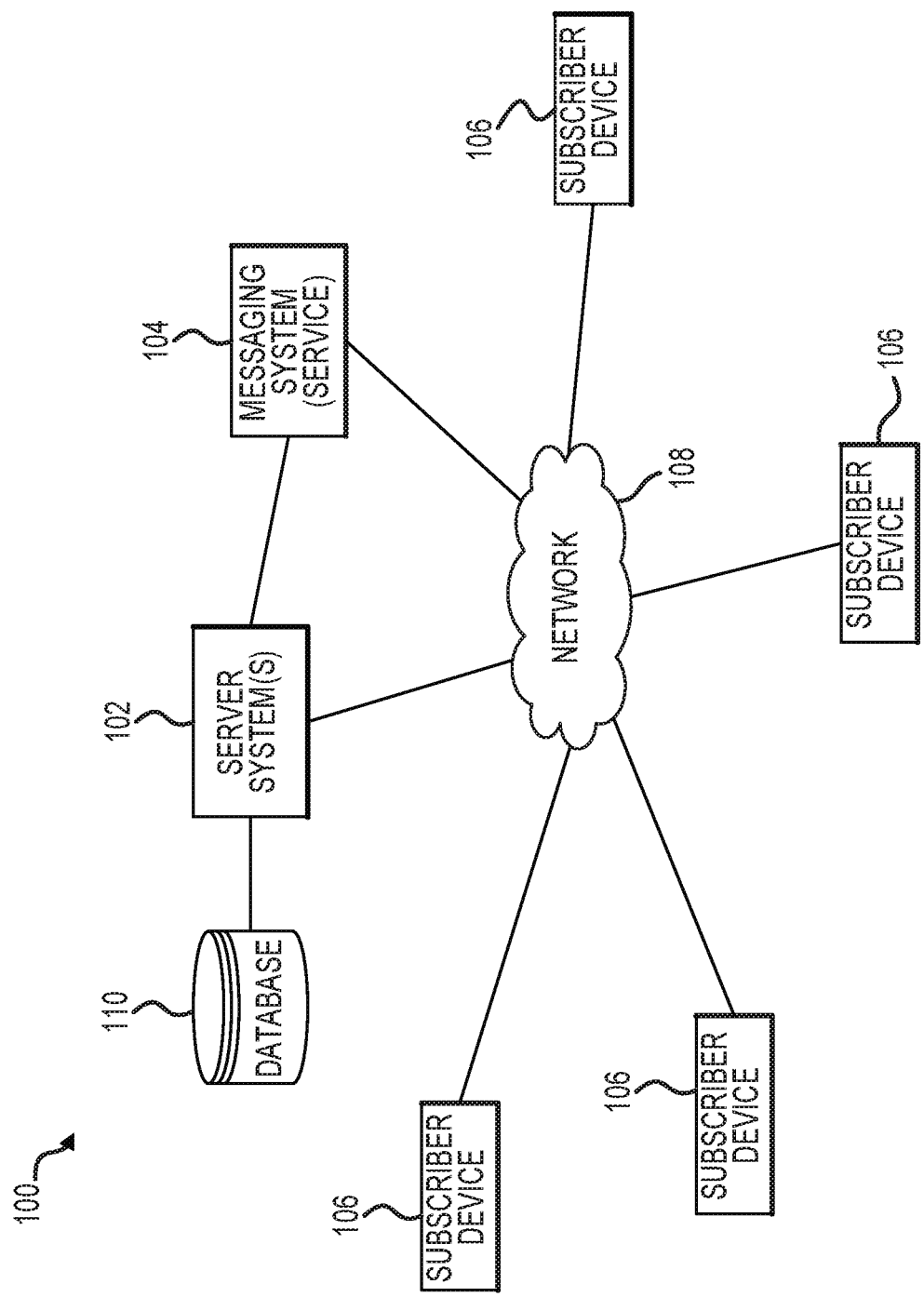
FIG. 1 is a simplified block diagram representation of an exemplary embodiment of a message-based narrative content delivery system (NCDS)

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or the like, various elements of the systems described herein are essentially the code segments or instructions that cause one or more processor devices to perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Overview

The message-based narrative content delivery system (NCDS) described herein provides an interactive service and two-way messaging system that delivers on-demand entertainment (in the form of narrative fiction, for example) via an appropriate messaging platform. Outgoing messages are sent to the user via a chosen, preferred, or default messaging service (e.g., a text messaging app on a mobile device, a messaging app or service provided by a social media platform, an email service, an instant messaging app, or a customized client app that is specifically designed to support the NCDS). Users respond to messages sent by the NCDS with a text message, button selection, or other identified response (photo, location, etc.) in order to advance content via delivery of new messages. In accordance with certain embodiments, narrative content proceeds based on the user's chosen or correct response until the story is completed. At the completion of the story, the user has experienced a unique narrative resulting from choices made during the experience.

The NCDS, which manages the content delivered for interactive narrative storylines, is agnostic to the process or processes that are handling the data, input, and display to the reader. The various functions and features supported by the NCDS can all be contained within one process (executable or app) or they can be easily split between client apps (that handle the gathering of input and displaying of output) and one or more server-based processes.

The NCDS is an entertainment service founded on the principle of a library of branching stories that users navigate by sending and receiving messages back and forth between a content delivery server system and respective subscriber devices. The server system responds to specific commands, instructions, or selections received from the subscriber/client devices. As a single user progresses through a narrative storyline, the server system will store relevant information and retrieve it when necessary in order to deliver a unique narrative experience based on the various user decisions.

The service is based on dynamic and ongoing interaction between the user (by way of the user's subscriber device) and the server system, and the service can be used in combination with any messaging system available on the market today or in the future, including, without limitation: the MESSENGER service provided by FACEBOOK; the SKYPE web-based communication service; Short Message Service; Multimedia Messaging Service; the TWITTER social media platform; the HANGOUTS communication platform provided by GOOGLE; the WHATSAPP messaging service; the VOXER communication service; and the like. Although text-based messaging services are suitable for use with the NCDS, other services and methodologies can be used, including, without limitation: instant messaging; email; social media comment threads; web-based two-way apps and services; image messaging services such as the SNAPCHAT service; voice recognition messaging tools and apps; customized and/or devoted client apps; and the like.

The NCDS supports at least two different content delivery modes (or story types): single user stories and multiuser stories. Single user stories can be made available for online delivery or offline consumption (for example, by way of a local download option). For the single user mode, the narrative storyline flow is controlled by only one user/subscriber, and the pace at which the user progresses through the storyline is primarily (or exclusively) dictated by the user's individual interaction with the narrative storyline. In contrast to single user stories, multiuser stories collect and act upon the feedback and input of at least two different users. Thus, in a multiuser story, the narrative storyline flow can be individually controlled by each respective user until a point in the story that requires a decision, a choice, or some form of user interaction. At certain decision points, the server system collects the responses from multiple users, processes or analyzes the collected responses, and determines how the storyline is to proceed based on the collected responses.

The particular formatting, content, and configuration used for the narrative storyline messages can vary from one embodiment to another as needed to suit the particular needs and requirements of the platform, subscriber devices, and the like. In accordance with text message based embodiments, the NCDS defines user responses primarily through the use of square brackets (or any designated characters) within the text content itself for any messaging service in use, wherein each segment of bracketed text represents a storyline option that can be chosen by the user. For example, the following message includes two choices for the user: "You are running across a broken bridge, but you may not make it if you [jump]. Maybe you should [stop] instead." In this scenario, the user can respond with a text message that includes the word "jump" or with a text message that includes the word "stop" to indicate the chosen storyline option. The user inputs and sends the text contained inside the brackets to the server system to indicate her response during the current state or stage in a story.

In the above example, assume that the user texted "jump" to the service as her choice. The service responds by delivering a follow up narrative storyline message that is contextually related to the decision to jump. In this case, the next delivered content stage might be: "Of course you didn't make it. You're not a mutant superhero, you tell yourself, as you fall into the raging river below. In a panic you see a [log] about to float by between you and the [riverbank]." From this point, the user continues to advance the storyline in a linear or serial manner by making additional choices indicated in the narrative storyline messages.

Specified punctuation marks or characters may be used in a similar fashion to indicate other actions, or even open-ended responses that deliver no options in the content, but are indicated at the outset of an experience. For example, the service can provide the following notification to the user at the beginning of a story: "The following commands are available during this experience: left, right, forward, backward, up, down, and use."

The service is designed to retain data on each user's current stage or state of the narrative storyline and, based on the response received, deliver the correlating text response associated with the received command. The service may have a core set of instructions available using "help" as a command to deliver status data to the user in order to provide additional information regarding the user and/or current entertainment stage.

The NCDS can utilize at least two primary narrative types to deliver narrative content to a subscriber: linear and free-roam narratives. A linear narrative storyline works by funneling the user through a series of defined choices. The user responses to the choices determine the outcome of the narrative storyline and the manner in which the outcome is reached. A free-roam narrative storyline is less restrictive, but not as concise. Instead of funneling the user, a free-roam narrative storyline gives the user the ability to move about a virtual world (conveyed via text messages or commands) and decide what to do and where to go next. A linear narrative is the most basic type of narrative. It simply presents the user with decisions. The user responses are stored as the user directs the narrative experience. The following is an example of a linear narrative:

Received Text: Little Red Riding Hood looks at the fork in the path. To the right are wolf prints in the dirt. To the left are drops and smears of blood. Should she go [right] or [left]?

At this point the user can respond with a reply text that includes either "right" or "left", and the next text received at the subscriber device will be based on the user's reply. Thus, if the user replies with "right" then the next received text might be: "I'm pretty sure it's this way," Red whispers with a shiver as she starts down the [path] with the wolf prints. If, however, the user replies with "left" then the next received text might be: Red inches alongside the trail of blood and hears low, ragged breaths ahead. She slowly inches [closer] and hears a whimper of pain.

In certain embodiments, linear storytelling can utilize a gate method, where a series of choices branch out into different experiences, but will converge at common narrative points or "gates" in order to ensure that the story stays manageable between episodes and major events.

A free-roam narrative storyline is a more complex type of narrative that is akin to a text-based role-playing game. In some embodiments, the user has access to a universal command list that can be used to interact with the free-roam narrative. The universal commands are used to advance the narrative. Suitable commands may include, without limitation: Go (in a specified direction); Look; Read; Take; Climb; Drop; Attack; Help; Communicate; Walk; Jump; and Stop. The NCDS can employ a predefined global list of potentially valid user commands, only some of which might be usable for a given point in a free-roam story, depending on the current state/status of the storyline. In certain embodiments, the NCDS can dynamically adjust or update the list of potentially valid commands in an ongoing manner in response to user feedback, for a customized user experience, or the like. Moreover, the list of potentially valid commands can vary from one free-roam story to another. The following is an example of a free-roam narrative:

Received text: "You are standing in an open field west of a white house, with a boarded front door. There is a small mailbox here." The user can respond with any number of different commands:

Look: the scene text is repeated
Go south: the scene switches to south of the house
Go east: the scene switches to behind the house
Open mailbox: the mailbox is opened Choosing any one of these commands doesn't prevent the user from returning to the first scene and doing something different (or the same). Thus, the free-roam narrative storyline may progress in the following manner:

Received text: "You are standing in an open field west of a white house, with a boarded front door. There is a small mailbox here."

Sent text: "Go east"

Received text: "You are behind the white house. There is no door here, and all the windows are boarded."

Sent text: "Go west"

Received text: "You are standing in an open field west of a white house, with a boarded front door. There is a small mailbox here."

Sent text: "Open mailbox"

Received text: "Opening the mailbox reveals a small leaflet"

Sent text: "Read leaflet"

Received text: "Welcome to the next big thing in mobile gaming and storytelling!"

A free-roam narrative embodiment should contemplate errors or unrecognizable user responses. Thus, if an unrecognized or invalid word or phrase is received by the server system, the system can generate and communicate a suitably formatted warning message (which is intended for the user of the subscriber device). For example, the warning or error message may be a text message that conveys "That command is not recognized, please try again." If invalid or unrecognized response messages are repeatedly received (e.g., three in a row), then the next message may contain additional information or a hint that helps the user understand what they should be doing. For example, a follow-up text message can include a link to instructions or to a hints or tips page.

The NCDS can leverage global positioning system features and functionality to provide geo-location based narrative storylines. In this regard, the narrative storyline messages sent to the subscriber devices may include location aware information or choices, and reply messages generated by the subscriber devices may include global positioning system (GPS) data that identifies the location of the user. In this way, a geo-location enabled storyline can be used to deliver content similar to a scavenger hunt that reveals new clues or story elements through a variety of locations and clues or directions. This type of narrative storyline might require the user to reply to the server system with a geo-tagged message, image, or have location GPS detection activated on the subscriber device when they reply. If the user is not at a specified location when they reply, then the narrative storyline will not advance.

The NCDS can also leverage the camera features and functionality of subscriber devices. For example, photo-recognition can be utilized to detect objects, shapes, landmarks, and/or facial expressions for purposes of driving the narrative storyline forward. Accordingly, a storyline message delivered to a subscriber device may instruct the user to capture an image of a certain necessary object or relay a particular facial expression back to the server system. Branching storylines could be made to diverge based on a facial expression or an image of an item received with a user reply. This image-based feature can also be used in conjunction with the geo-location feature described above, requiring images of certain things to be conveyed with a specific geo-tagged location to ensure authenticity.

The NCDS can also include visual content in the narrative storyline messages sent to users. To this end, the NCDS can provide pictures, animations, video content, and/or links that point to such content as supplemental content with text messages. Images can be delivered to subscribers who use certain types of mobile apps or web apps to inform details on scenes, characters, or choices. Images could also be used to unlock new content. For example, a narrative storyline can be authored such that there will be no contextual command for a doorknob until the user examines an image of it and then tries to turn the doorknob.

In accordance with certain embodiments, the NCDS maintains and updates a user profile database that includes choice profile database objects corresponding to the subscribers. Each choice profile database object includes dynamically updateable user profile data that reflects the choices made by the user. Thus, choice profile data can be generated for every decision the user makes within the narrative storylines. In certain embodiments, the NCDS utilizes internal trait tags or metadata associated with the various user-specified storyline options or choices. At least some choices presented to the user can relate to any number of defined traits and respective attributes. The embodiment described herein can be considered using the following non-limiting examples of core personality traits—Attitude, Analysis, Approach—and their respective attributes: Attitude=Extrovert/Introvert; Analysis=Logic/Emotion; Approach=Structured/Spontaneous. When the user completes a narrative storyline (only when completed to avoid them reloading and skewing their tags over and over) the corresponding choice profile database object is updated to "adjust" the attributes for the particular traits. Moreover, a profile type can be assigned to the user based on the current status of identified and monitored traits. In this way, a user's profile type can be dynamically updated over time to reflect additional content. The profile data can also be used to help develop a detailed purchase profile for the user to drive more accurate recommendations as well as shape future content releases. It should be appreciated that the personality traits and associated attributes mentioned above are merely exemplary. An implementation of the NCDS can employ additional and/or alternative personality traits, with or without corresponding attributes if so desired.

The NCDS may also include various statistics-related features or functions that are associated with user choices. For example, at the end of each chapter in a story the NCDS can generate a report that includes statistics related to user choices made during the chapter and/or during the story up to that point. The statistics can highlight important or relevant choices in a way that conveys a summary to the user. Statistical data related to user decisions can also be used for activity feed pushes and friend notifications.

EXEMPLARY EMBODIMENTS

Turning now to the drawings, FIG. 1 is a simplified block diagram representation of an exemplary embodiment of a message-based narrative content delivery system (NCDS) 100. The NCDS 100 generally includes, without limitation: a cloud-based server system 102; at least one messaging system or service 104; and one or more subscriber devices 106. The NCDS 100 includes or cooperates with a communication network 108 that supports data communication between the various components of the NCDS 100. It should be appreciated that a practical implementation of the NCDS 100 may include additional devices, components, subsystems, and elements configured to support conventional features and functions (which will not be described herein).

The server system 102 can be realized using one or more computer-implemented components (which may be arranged in a physically distributed configuration or co-located if so desired). The computer-based server system 102 is suitably designed, configured, and programmed to support the various functions, processes, and tasks described in more detail below. In this regard, the server system 102 can include a plurality of logical and/or physically distinct modules or processing components that perform various functions such as, without limitation: user/subscriber account creation and management, including purchase of content via, for example, an online store; user/subscriber authentication; creating, editing, and maintaining narrative storyline files; digital content management; generating and sending narrative storyline messages; receiving and processing user response messages; and processing data associated with received user response messages.

The server system 102 includes, cooperates with, and/or communicates with at least one database system 110. The configuration and operation of databases and database management systems are well known, and such conventional aspects of the database system 110 will not be described herein. The database system 110 can include or be associated with any number of physical and/or logical database structures that are arranged to store and maintain data used by the NCDS 100. Accordingly, the database system 110 can handle any of the following, without limitation: storyline data corresponding to the interactive storylines provided by the NCDS 100; subscriber/user authentication and account data; subscriber/user profile data including all actions and activity in single and multiuser storylines; multimedia content that can be delivered with narrative storyline messages; and statistical data associated with user response messages. The storyline data maintained by the server system 102 defines variable narrative paths for each interactive narrative storyline, wherein the variable narrative paths influence at least one outcome of each storyline. In other words, the storyline data contemplates multiple variations in how a story progresses from a starting point to at least one endpoint; any given variation will be determined by choices made by the user.

The exemplary embodiment of the NCDS 100 is suitably configured to send narrative storyline messages from the server system 102 to the subscriber devices 106, and to handle user response messages sent from the subscriber devices 106 to the server system 102. In practice, the NCDS 100 may include or cooperate with at least one messaging service 104 that handles the communication of such messages. In certain embodiments, the NCDS 100 is compatible with a wide variety of messaging protocols, applications, service providers, and the like. Thus, the messaging service 104 may include or be configured as a text messaging service, an instant messaging service, an email service, a social media application, or the like. Moreover, the messaging service 104 may be affiliated with or maintained by an entity that is different than the entity that is associated with the NCDS 100. For example, a first entity that controls the operation of the NCDS 100 may have operating agreements with a second entity that controls the operation of the messaging service 104. In this context, the second entity might be a company that is associated with an existing messaging platform, such as, without limitation: the MESSENGER service provided by FACEBOOK; the SKYPE web-based communication service; a cellular service provider that provides its own text messaging app; the TWITTER social media platform; the HANGOUTS communication platform provided by GOOGLE; the WHATSAPP messaging service; the VOXER communication service; and the like.

The NCDS 100 can support any number of subscriber devices 106. For simplicity and ease of illustration, FIG. 1 only depicts four subscriber devices 106. Each subscriber device 106 is implemented as a computer-based hardware component. Thus, each subscriber device 106 generally represents an electronic device coupled to the network 108, which may be utilized by a user to interact with the narrative storyline features of the NCDS 100. In practice, a subscriber device 106 can be realized as any sort of personal computer, mobile telephone, tablet, wearable device, gaming device, digital media player device, entertainment device, or other network-enabled electronic device that includes or cooperates with a display element.

The server system 102, the messaging service 104, and the subscriber devices 106 are communicatively coupled to the network 108, as mentioned above. The network 108 may include any suitably configured and arranged data communication network, or a combination of networks. For example, the network 108 can be any one or any combination of a LAN (local area network), WAN (wide area network), telephone network, wireless network, point-to-point network, satellite network, short range wireless link, or the like. The NCDS 100 can utilize any network protocol, as appropriate to the particular implementation.

The exemplary embodiment described herein assumes that the server system 102 performs the bulk of the processing required to support the operation of the NCDS 100. In alternative embodiments, however, at least some of the functionality can reside locally at the subscriber device 106. For example, the narrative storyline data, multimedia content, and processing logic that determines how best to handle user response messages can reside at the subscriber device 106. In some embodiments, the server system 102 can be used for user authentication, account management, and other system-wide processes, while the actual storyline data and related content is downloaded to the subscriber device 106 for local execution in a protected, proprietary format (encrypted), without continuous communication with the server system 102. In this regard, the server system 102 may include or cooperate with a suitably configured digital rights management (DRM) system, module, or service if so desired. These and other practical operating scenarios are contemplated by this disclosure.

Figure 2:
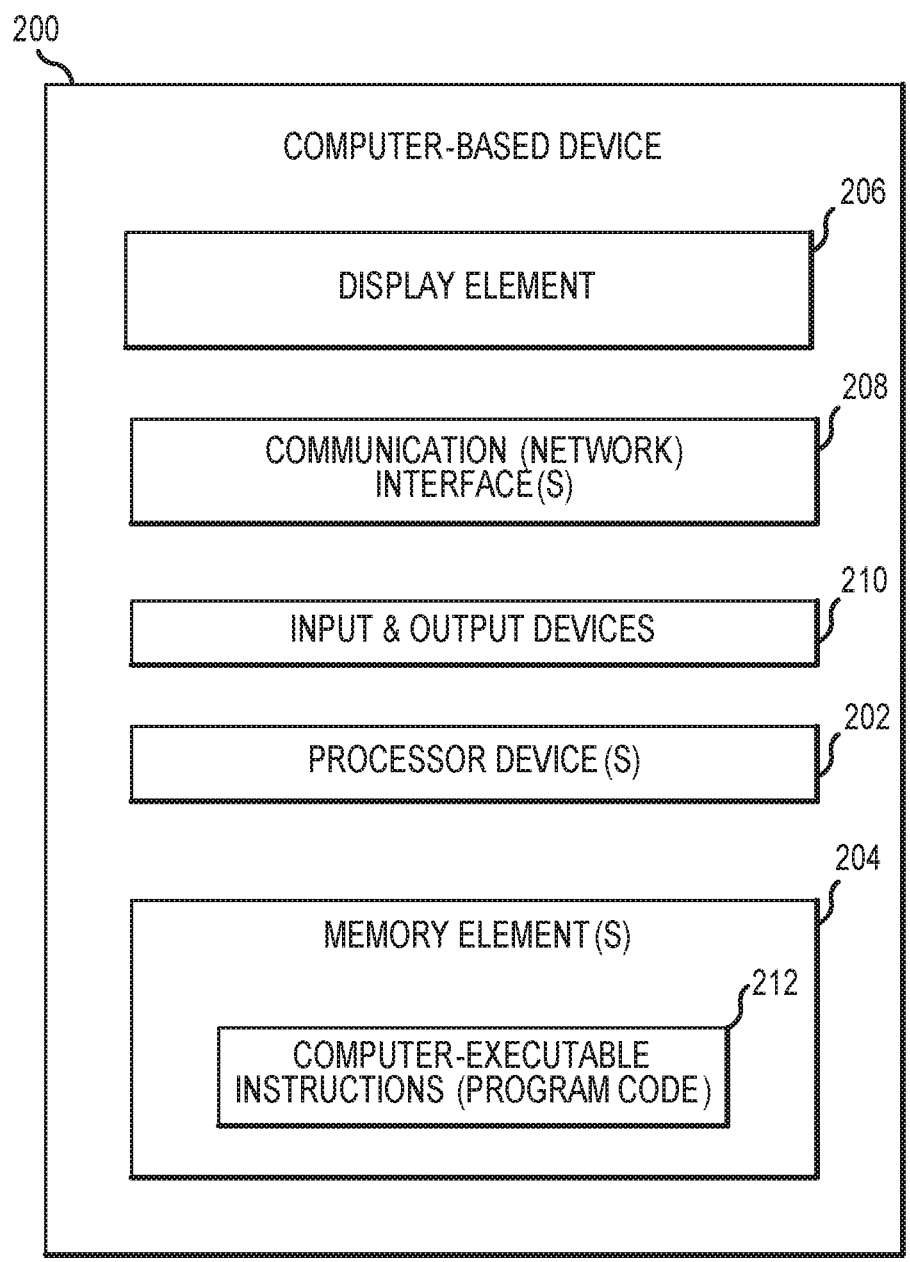
FIG. 2 is a simplified block diagram representation of an exemplary embodiment of a computer-based device that is suitable for use in the NCDS depicted in FIG. 1.

Each subscriber device 106, the server system 102, and the system that provides the messaging service 104 can be implemented using at least one suitably configured computer-based or processor-based platform. In this regard, FIG. 2 is a simplified block diagram representation of an exemplary embodiment of a computer-based device 200 that is suitable for use in the NCDS 100. The device 200 generally includes, without limitation: at least one processor device 202; at least one memory element 204; a display element 206; at least one communication (network) interface 208; and input and output (I/O) devices 210. In practice, the device 200 can include additional components, elements, and functionality that may be conventional in nature or unrelated to the core functionality of the NCDS 100.

A processor device 202 may be, for example, a central processing unit (CPU), a field programmable gate array (FPGA), a microcontroller, an application specific integrated circuit (ASIC), or any other logic device or combination thereof. The memory element 204 is communicatively coupled to the processor device 202, and it can be implemented with any combination of volatile and non-volatile memory. The memory element 204 has non-transitory computer-executable instructions (program code) 212 stored thereon, wherein the instructions 212 are configurable to be executed by the processor device 202 as needed. When executed by the processor device 202, the instructions 212 cause the processor device 202 to perform the associated tasks, processes, and operations defined by the instructions 212. Of course, the memory element 204 may also include instructions associated with a file system of the host device 200 and instructions associated with other applications or programs. Moreover, the memory element 204 can serve as a data storage unit for the host device 200.

The display element 206 may be integrated with the device 200 or coupled to the device 200 as a peripheral. The shape, size, resolution, and technology of the display element 206 will be appropriate to the particular implementation of the device 200. The display element 206 can be realized as a monitor, screen, or another conventional electronic display that is capable of graphically presenting data and/or information provided by the device 200. In certain embodiments, the display element 206 is a touch-enabled display (e.g., of the type commonly used with mobile phones).

The communication interface 208 represents the hardware, software, and processing logic that enables the device 200 to support data communication with other devices, via the network 108. In practice, the communication interface 208 can be suitably configured to support wireless and/or wired data communication protocols as appropriate to the particular embodiment. For example, if the device 200 is a smartphone, then the communication interface 208 can be designed to support a cellular communication protocol, a short-range wireless protocol (such as the BLUETOOTH communication protocol), and a WLAN protocol. As another example, if the device 200 is a desktop or laptop computer, then the communication interface can be designed to support the BLUETOOTH communication protocol, a WLAN protocol, and a LAN communication protocol (e.g., Ethernet).

The I/O devices 210 enable the user of the device 200 to interact with the NCDS 100 as needed. In practice, the I/O device 210 may include, without limitation: a speaker; a haptic feedback device; a microphone; a mouse or other pointing device; a touchscreen or touchpad device; a keyboard; a joystick; or any conventional peripheral device. In this context, the display element 206 can be categorized as an I/O device 210.

Figure 3:
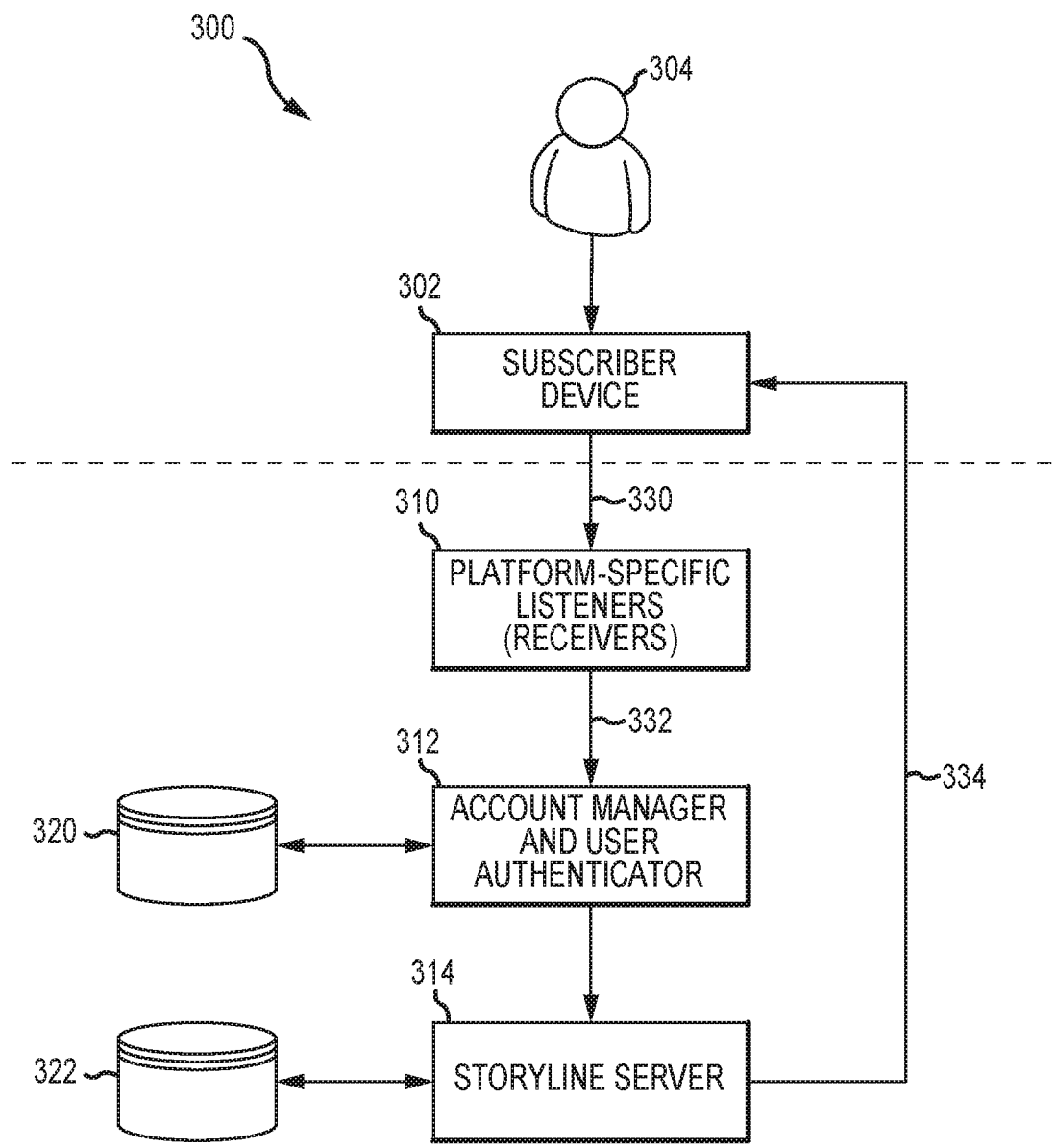
FIG. 3 is a simplified block diagram representation of an exemplary implementation of a message-based NCDS.

FIG. 3 is a simplified block diagram representation of an exemplary implementation of a message-based NCDS 300. This particular embodiment of the NCDS 300 assumes that a subscriber device 302 is operated by a user 304, and that the subscriber device 302 is suitably configured to receive narrative storyline messages and generate associated response messages as needed to move forward through a narrative storyline. It should be appreciated that an NCDS as described herein need not be configured as depicted in FIG. 3; the embodiment depicted in FIG. 3 is merely one practical and suitable deployment. The elements below the dashed line in FIG. 3 represent the "cloud-based" or "server-side" components/modules of the NCDS 300. Accordingly, the elements below the dashed line correspond to the server system(s) 102 and the database system 110 shown in FIG. 1. In contrast to the server-based components, the subscriber device 302 is considered to be a "local" or "client-side" component of the NCDS 300. In practice, the NCDS 300 can include any number of NCDS servers working in conjunction with one another to provide the required functionality.

The illustrated embodiment of the NCDS 300 includes platform-specific listeners 310 (also referred to herein as listener servers), an account manager and user authentication module 312, and a storyline server 314. The account manager and user authentication module 312 includes or cooperates with a suitably arranged account database 320, and the storyline server 314 includes or cooperates with a suitably arranged story database 322. Although the databases 320, 322 are depicted as separate components, they can be realized as two logical partitions of a single database if so desired. Moreover, the listeners 310, the account manager and user authentication module 312, and the storyline server 314 can be realized using one piece of computer-based equipment or using a plurality of distinct computer-based hardware components that cooperate with one another to support the desired operating features of the NCDS 300.

The platform-specific listeners 310 receive and parse input 330 obtained from the subscriber device and other subscriber devices. As explained above, NCDS 300 is preferably compatible with a variety of different messaging apps, programs, methodologies, and protocols. To this end, the NCDS 300 includes at least one listener 310 for each unique input message source or type (e.g., one assigned to handle messages generated by the MESSENGER service provided by FACEBOOK, another one assigned to handle messages generated by the TWITTER social media service, and yet another one assigned to handle SMS messages). In this regard, one or more NCDS servers can be connected to any number of listener servers, including multiple listener servers per messaging application or type. The listeners 310 monitor the incoming message streams to parse the input corresponding to each unique message source. The listeners 310 determine the source of each incoming message, parse out any appropriate data from the corresponding user input, and pass the extracted data along to the backend system. The parsed input 332 is presented to the account manager and user authentication module 312.

The specific functionality of each listener 310, such as the parsing and identification functions, varies based on the type of message as received. For example, the listeners 310 associated with a customized client app, the FACEBOOK MESSENGER app, and a conventional SMS/MMS app can be suitably configured for compatibility with those particular apps. In accordance with an exemplary embodiment of a customized client app, the listener 310 connects directly to the NCDS server and sends pure text to it for user input. The NCDS server then sends pure raw text back to the user with tags for any visual or audio to play.

For a third party app, such as the FACEBOOK MESSENGER app, incoming messages can be initially handled by an app or service provided by the third party, wherein the third party app serves as an intermediary for the corresponding listener 310. The third party app communicates with the NCDS server, which in turn communicates with the listener 310 assigned to the third party app. The listener 310 is responsible for reformatting messages for compatibility with the third party app, such that the NCDS 300 can deliver storyline messages in a format that is consistent with the requirements of the third party messaging app.

For an SMS/MMS (texting) app, messages sent to one or more phone numbers (in practice, the NCDS 300 will likely have multiple phone numbers associated therewith) will be handed by the corresponding SMS listener 310. That listener 310 will obtain the sender phone number and the associated text content. The sender phone number and text is sent (via packet) to the NCDS server, which processes the text and replies to the SMS listener 310 with the next text content to be returned to the client device. The SMS listener 310 creates a suitably formatted message with the appropriate phone number and reply message content, which might include a URL. Note that the SMS listener 310 can divide the reply message content in to multiple messages if needed to comply with message size limitations. Moreover, the SMS listener 310 can communicate with a third party service (e.g., a platform as a service company such as the TWILIO platform) that acts as an intermediary to handle the sending of the actual text messages to the end users.

The account manager and user authentication module 312 obtains the parsed input 332 and attempts to authenticate the user identified in the parsed input 332. The account database 320 is accessed during this authentication routine. Assuming that the user is authenticated, the corresponding account information and the parsed input 332 is provided to the storyline server 314 for processing. The storyline server 314 accesses the story database 322 to obtain the next narrative storyline message 334, which is communicated back to the subscriber device 302 for presentation to the user 304. In practice, the same communication channel or mode that was used to receive the input is also used for communication of the next narrative storyline message 334.

The formatting, content, display characteristics, and/or functionality of the narrative storyline messages can vary as needed to suit the capabilities of the particular subscriber device platforms and messaging applications. Accordingly, a particular narrative storyline message can include: text; image content; video content; hypertext; active control elements, such as selectable buttons; audio content; voice recognition features or functionality; or any combination thereof. In this regard, a storyline message can include a background soundtrack that plays while the message is displayed to the user. As another example, a storyline message can include sound effects that are triggered when the user enters/exits the message. Moreover, the arrangement of the message content and visual characteristics of the narrative storyline message can vary to accommodate the particular subscriber device and messaging application used to interact with the NCDS. Consequently, the experience of the user can vary depending on how they are consuming the story. For example, if the user is interacting with a story using the FACEBOOK service, then audio, music, and sound effects might be part of the experience. In contrast, if the user is interacting with the same story using a basic SMS app, then enhanced multimedia features might be disabled or missing from the experience.

Figure 5:
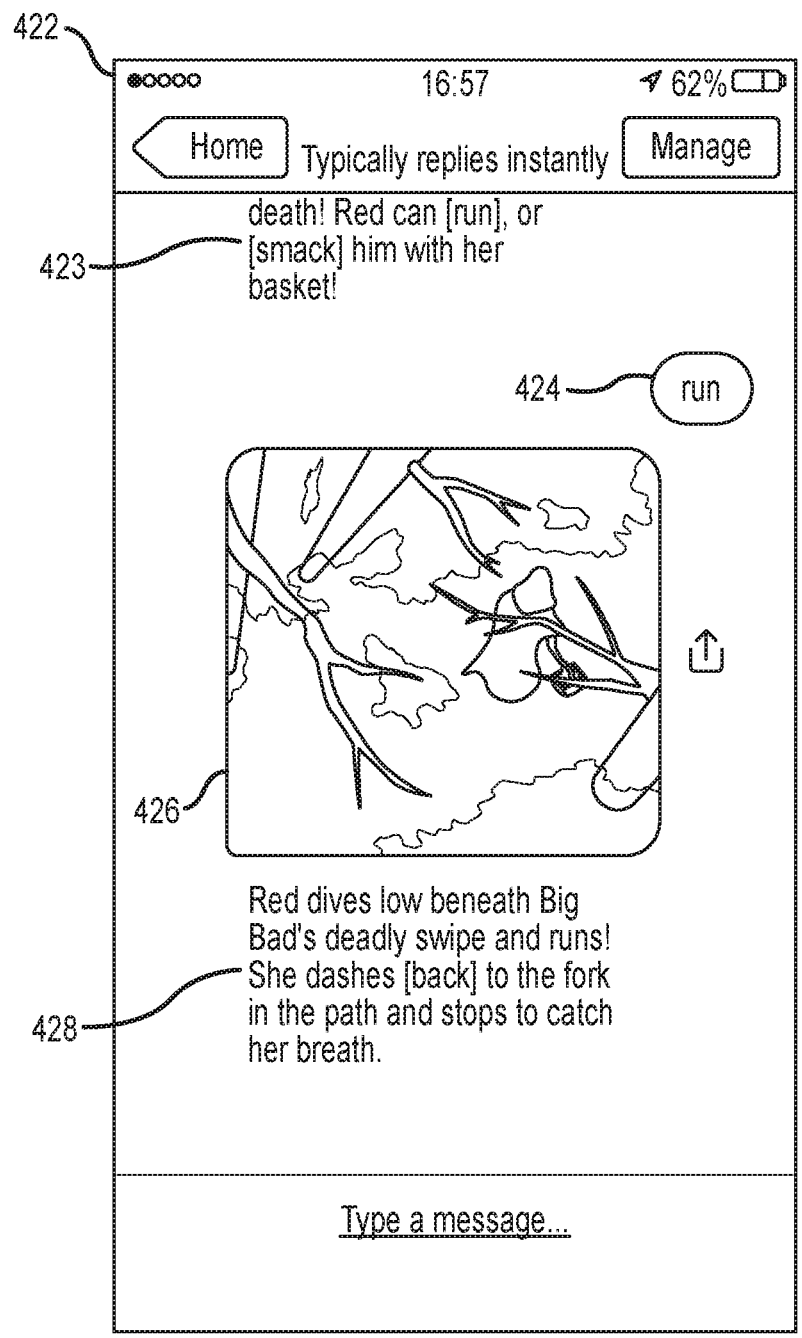
Figure 6:
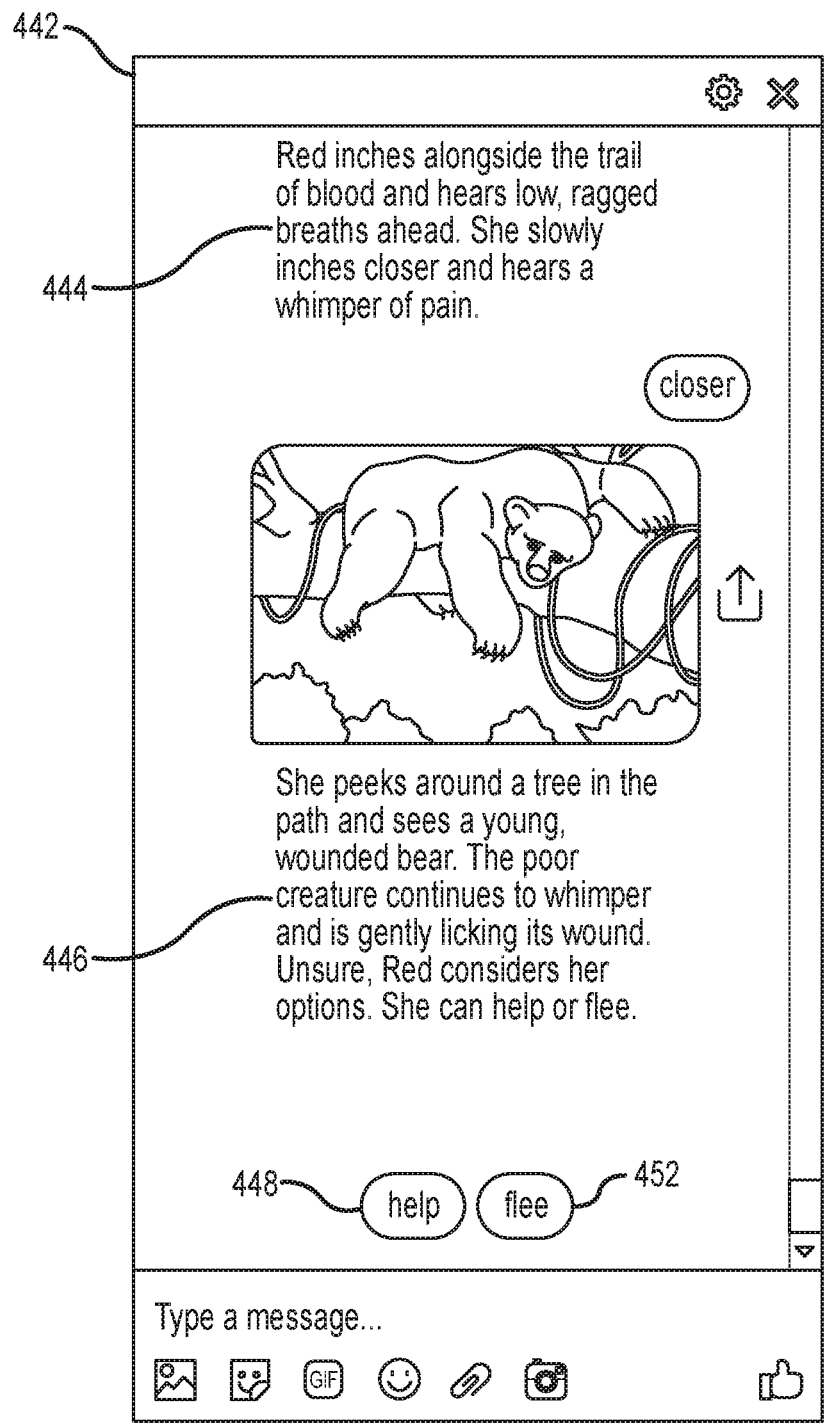

As explained above, the NCDS can be flexibly configured for compatibility with third party or off-the-shelf messaging applications. In this regard, FIGS. 4-6 depict screen shots associated with different messaging apps, wherein each screen shot includes a portion of the same narrative storyline.

Figure 4:
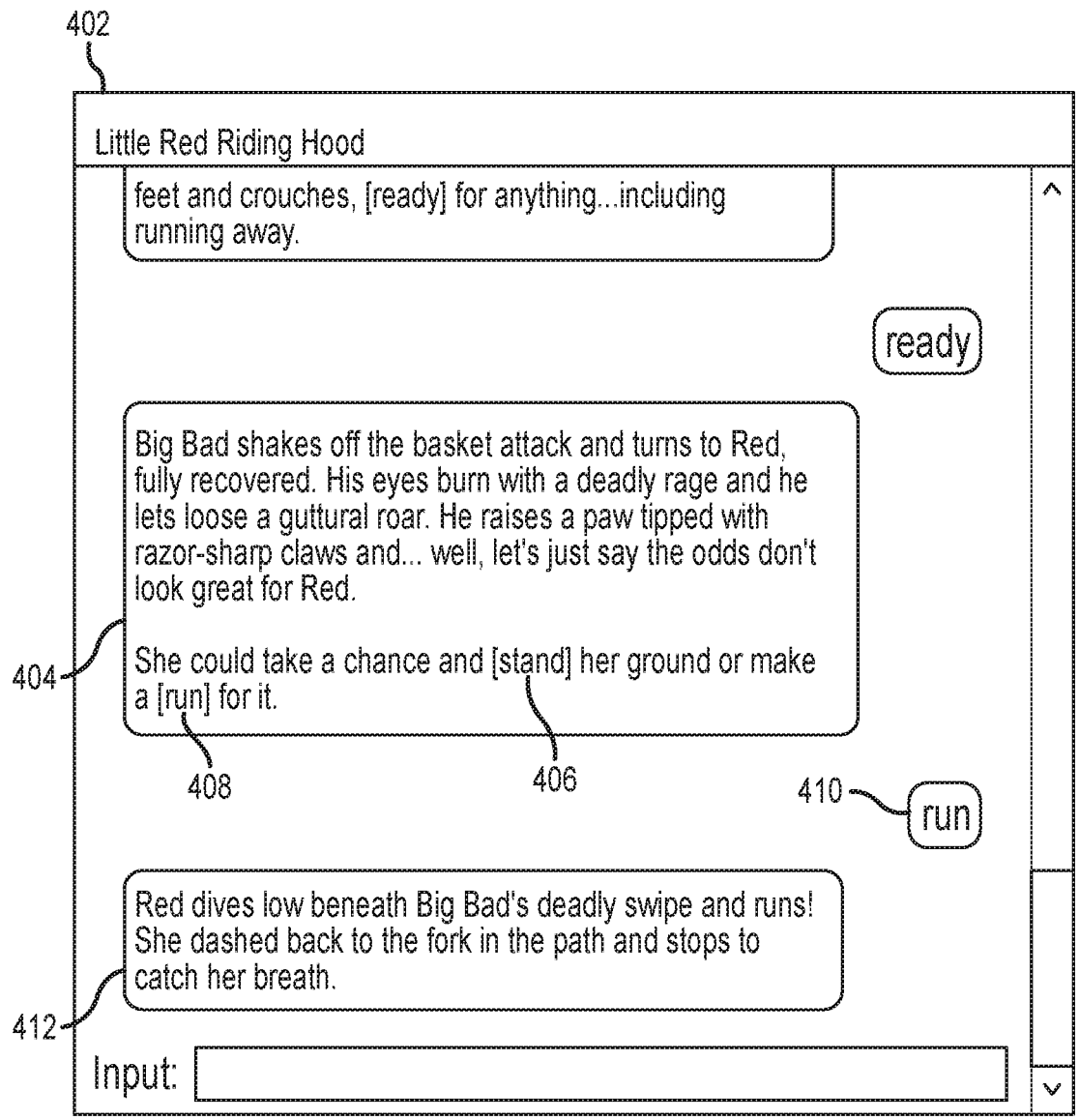
FIGS. 4-6 depict screen shots associated with different messaging apps, wherein each screen shot includes a portion of a narrative storyline.

The screen shot 402 depicted in FIG. 4 represents a simple text-based implementation where the narrative storyline messages include text (without any image, video, audio, or other content). The narrative storyline message 404 includes a readable passage related to the story titled "Little Red Riding Hood." The last sentence of the message 404 includes or conveys two different candidate storyline options 406, 408, which are surrounded by brackets to distinguish them from the remainder of the message 404. The first candidate storyline option 406 corresponds to the word "stand" and the second candidate storyline option 408 corresponds to the word "run" in the following sentence: She could take a chance and [stand] her ground or make a [run] for it. The user can choose either of the candidate storyline options 406, 408 to move the story forward. This example assumes that the user chooses the "run" option and sends a response message 410 that includes the word "run" as the user-specified storyline option. The illustrated embodiment assumes that only the word "run" is entered into the response message 410. In certain embodiments, however, the response message 410 can include additional information, as long as the NCDS is able to accurately identify and process the user-specified storyline option. The NCDS receives the response message, identifies the user-specified storyline option, retrieves the next storyline message (which is dictated by the identified option), and communicates the next storyline message to the subscriber device. FIG. 4 shows the next storyline message 412, which includes another portion of the current narrative storyline. Notably, the next storyline message 412 does not include any candidate storyline options (i.e., there is no bracketed text in the message 412). Thus, the current storyline may automatically continue after a designated period of time, or in response to a designated word or phrase entered by the user, such as "continue" or "next", or in response to a partial spelling of a designated word. To this end, the NCDS can be designed with intelligence to recognize typographical errors and/or incorrect user responses that suggest an intended response. In certain embodiments, the NCDS can leverage autocorrect, text prediction, translation, spelling correction, and/or other techniques and technologies if so desired.

In practice, the NCDS may employ a list of globally recognized commands, which can be entered by the user in response to a received message. These global commands can be entered whether or not a storyline message calls for an explicit choice. The global commands may include, without limitation: Exit; Pause; Resend Message; Go Back; Help; History; Restart; Library; and Menu.

The scenario described here assumes that the user-specified storyline option is actually one of the candidate storyline options conveyed in the received message. In other words, the selected option is valid and effective to move the story forward. The NCDS is suitably configured to detect and react to invalid, unintelligible, unknown, or erroneous user-specified storyline options. For example, the NCDS can return an error message or a warning if the user sends an invalid response message.

The screen shot 422 depicted in FIG. 5 includes the bottom portion of a storyline message 423 received at the subscriber device. This example assumes that the user chooses the "run" option and sends a response message 424 that includes the word "run" as the user-specified storyline option. Thus, the response message 424 includes a user-initiated reply to the communicated storyline message, which contains user-entered text for this particular example. The NCDS responds by sending the next storyline message to the subscriber device. FIG. 5 shows the next storyline message 426, which includes an image that can be displayed at the subscriber device. Although not always required, the image is preferably related somehow to the narrative storyline. In other words, images provided by the NCDS can serve as illustrations that are contextually associated with the narrative storyline. For this particular example, a subsequent storyline message 428 may include narrative text that progresses the story in a manner that is dictated by the "run" option selected by the user.

The screen shot 442 depicted in FIG. 6 includes the bottom portion of a previous narrative storyline message 444, and the entirety of a current narrative storyline message 446. FIG. 6 illustrates an embodiment that includes the user choices in a distinct area rather than integrated into the text of the message 446. Accordingly, the screen shot 442 includes two active elements that function as user-selectable buttons. One active element 448 corresponds to a first candidate storyline option, and another active element 452 corresponds to a second candidate storyline option. Selecting one of these active elements 448, 452 can automatically generate and send an appropriate response message, or automatically populate a response field to enable the user to send a text message that includes the selected storyline option.

The above examples illustrate different ways in which a user can reply to a narrative storyline message. The reply/response methodology can vary depending on the particular embodiment, the messaging service used, the subscriber device platform, the subscriber device app or feature that receives and presents the storyline messages, and/or user preferences. In this regard, the user can indicate his or her storyline choice using one or more of the following methodologies, without limitation: entering and sending text; selecting an active element (such as a displayed button, icon, or link); pressing a designated hotkey or button; entering a touch-sensitive gesture; speaking a voice command; selecting a directional arrow button or key; operating a joystick, mouse, or other type of pointing device; and shaking, moving, or orienting the subscriber device in a particular position. In practice, some of these user input methodologies and techniques can be natively supported by the stock messaging app of the subscriber device. In alternative implementations, a customized app or an app that is specifically written to support the NCDS can be utilized if needed to provide enhanced features and functions.

Figure 7:
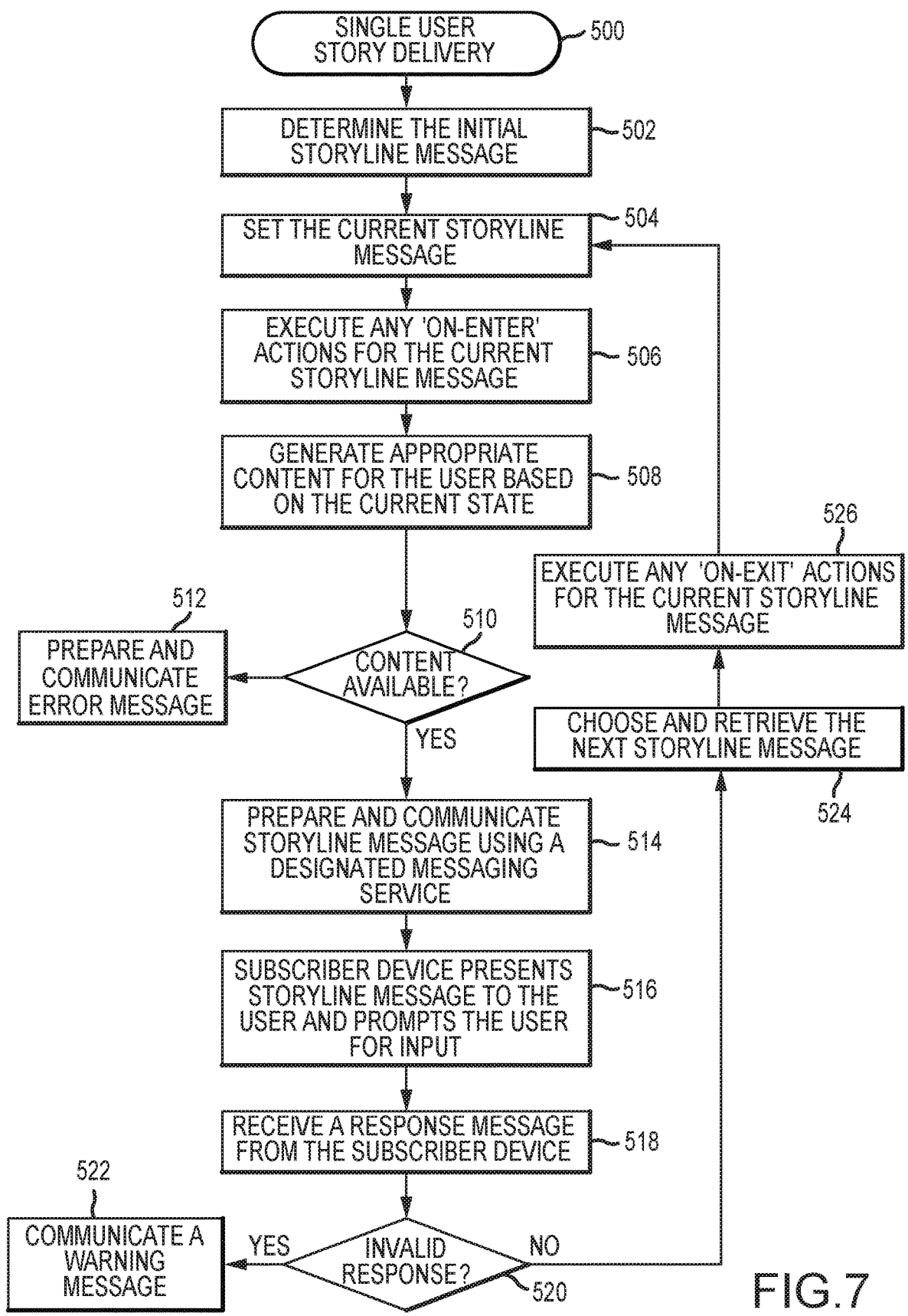
FIG. 7 is a flow chart that illustrates an exemplary embodiment of a single user story delivery process.
Figure 8:
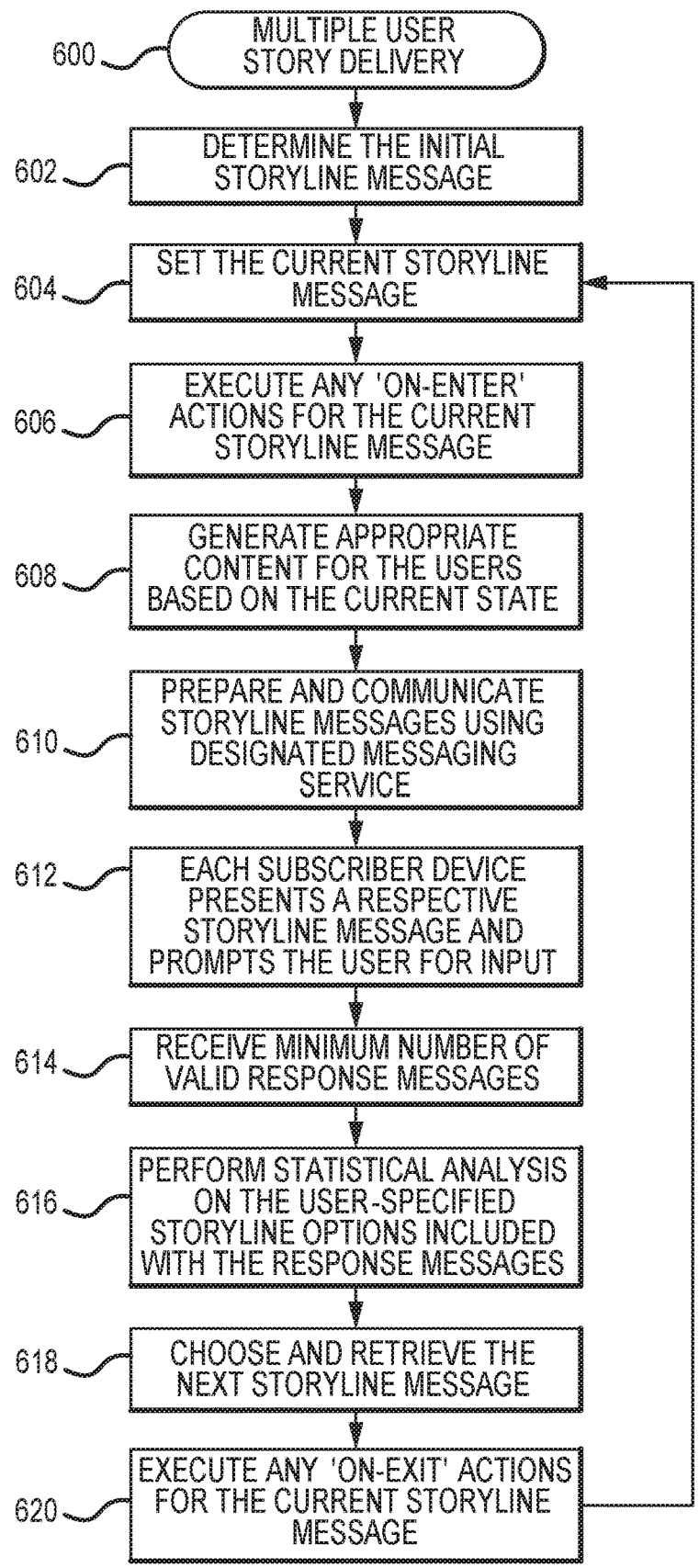
FIG. 8 is a flow chart that illustrates an exemplary embodiment of a multiple user story delivery process.

FIG. 7 is a flow chart that illustrates an exemplary embodiment of a single user story delivery process 500, and FIG. 8 is a flow chart that illustrates an exemplary embodiment of a multiple user story delivery process 600. The processes 500, 600 represent exemplary methods of delivering storyline content to users. The various tasks performed in connection with an illustrated process may be performed by software, hardware, firmware, or any combination thereof. In practice, portions of a described process may be performed by different elements of the NCDS, e.g., the server system, a messaging service, or a subscriber device. It should be appreciated that a described process may include any number of additional or alternative tasks, the tasks shown in a flow chart need not be performed in the illustrated order, and a described process may be incorporated into a more comprehensive procedure or process having additional functionality not described in detail herein. Moreover, one or more of the tasks shown in a flow chart could be omitted from an embodiment of the described process as long as the intended overall functionality remains intact.

The following description of the process 500 assumes that the user of the subscriber device is already registered with the NCDS, that the subscriber device includes a suitable app or native functionality that is compatible with at least one of the message-based services utilized by the NCDS, and that the user has already selected a story for delivery to the subscriber device. Moreover, this description assumes that the subscriber device communicates with a server system of the type described above, wherein the server system provides much of the described functionality and resources.

The illustrated embodiment of the process 500 begins by determining the initial narrative storyline message for the chosen story (task 502). Each story includes a defined starting point and a corresponding initial storyline message, and the server system can simply retrieve the initial message from the story database. The process 500 continues by setting the current storyline message to be delivered to the subscriber device (task 504). The initial narrative storyline message will be the current storyline message for the first iteration of task 504. For subsequent iterations of task 502, the server system can access the story database as needed to retrieve the next storyline message.

After setting the current storyline message at task 504, the process 500 executes any "on-enter" actions for the current storyline message (task 506). In this context, on-enter action are executed, and set their state, prior to the next passage being displayed. On-enter actions are executed in the background and, consequently, are invisible to the user. On-enter actions are utilized to modify, as the narrative advances, different states which can result in unique content being delivered based on the user choices. The results of on-enter actions need not be strictly server-side if users are permitted to consume content offline. If users cannot consume content offline, then the results of on-enter actions are held at the server side of the system. As one non-limiting example of an on-enter action, assume that the current storyline message from the NCDS is "You can go through the [red] door or the [blue] door" and that the user responds with "red". At this point, an on-enter action is set while entering the next passage, which communicates that the user chose red. This results in the next storyline message: "You arrived via the red door". On-enter actions may also relate to "behind the scenes" actions that the user the user experiences (such as playing music or a sound). Accordingly, on-enter actions are actions such as saving a specific decision that the user has made, or setting a hidden variable for testing or use later in the interactive story, playing a sound, or the like.

The process 500 may continue by generating appropriate content for the user, based on the current state/status of the storyline as maintained by the server system (task 508). The content generated at task 508 can vary from message to message, depending on the current state/status of the storyline. The system generates the content via pre-written narratives. The system knows what to generate based on the various states being set in the story from the user's input. In this regard, the system chooses which content to provide by testing rules the content creator has placed on the content. For example, the generated content can be a narrative passage of text having no user choices associated therewith, or it can include image data, audio data, video data, an active link, active elements such as selectable buttons, or the like. If for some reason no content is available (the "No" branch of query task 510), then the process 500 continues by preparing and communicating an error message or warning that is intended for the subscriber device (task 512). The message may contain an explanation or a suggestion for a proper user response. Following task 512, the process 500 may wait for the next response message (see task 518), it may advance the story in an appropriate manner that disregards or anticipates a correct user response, or it may take other corrective action as needed.

This description assumes that suitable content is available (the "Yes" branch of query task 510). Thus, the process 500 continues by preparing and communicating a storyline message from the server system, using a designated messaging service that is supported by the subscriber device (task 514). The communicated storyline message is intended for the particular subscriber device operated by the user. Task 514 prepares the current storyline message based on the current state/status of the story, and based on the last-received response message issued by the user (if any). In this regard, the communicated storyline message includes the next portion or segment of the interactive narrative storyline, along with the content generated at task 508. The storyline message is prepared and generated in a format and arrangement that is appropriate for the designated messaging service and the subscriber device platform.

The NCDS may include or utilize an appropriate messaging service to package and send the current storyline message to the intended subscriber device, using one or more network links as needed. This description assumes that the current storyline message is successfully received by the intended subscriber device. Accordingly, the subscriber device operates to process and present the current storyline message to the user (task 516). Presentation of the current storyline message may involve the display of text, image, and/or video content, the playback of audio content, the rendering of animation, the display of active graphical user interface (GUI) elements, or the like. As mentioned previously, the current storyline message can prompt the user to provide input or feedback (by way of a response message), or the current storyline message can simply be a narrative passage that requires no user feedback or reply. For the latter scenario, the process 500 may automatically generate and send the next narrative storyline message after a designated period of time, in response to the user closing and opening the messaging app, or in response to any predetermined triggering criteria, which need not involve user activity at the subscriber device. Note that such triggering criteria can be different on each different form of messaging. For example, with the FACEBOOK MESSENGER platform, triggering criteria could be tied to a user becoming "active" again after a period of inactivity, wherein that specific type of triggering may not possible with other services or platforms, such as SMS. As another example, the triggering criteria could be associated with a voice command or instruction processed by a voice recognition enabled system or an interactive response service (e.g., the ALEXA control system, the CORTANA system, the SIRI system, or the like).

This example assumes that the current narrative storyline message prompts the user to make a choice. As explained above with reference to FIGS. 4-6, the storyline message may include bracketed text, active GUI elements, or highlighted text that identifies the candidate storyline options available to the user. In a free-roam implementation, the current storyline message need not include any indication or user prompt. In this regard, the user must determine how best to respond, and what text (if any) to send in the next reply. Regardless of the particular implementation, the subscriber device is controlled and operated in an appropriate manner to send an appropriate response message, wherein the response message is intended for the messaging service and/or the server system. Although not always required, this description assumes that the response message includes at least one user-specified storyline option. In other words, at least some of the content of the response message is based on a user-entered choice, a user-selected button, a user-designated command, or the like. In certain embodiments, the user-specified storyline option identifies a user selection that corresponds to user interaction with the current narrative storyline message, e.g., activation of a hyperlink, activation of a GUI button, initiating playback of a media file, or viewing an image. In other embodiments, the user-specified storyline option includes user-entered characters that correspond to highlighted or bracketed text contained in the current narrative storyline message.

Absent any data communication errors, the server system receives the response message (task 518). Notably, the received response message is generated by the subscriber device in response to the previously communicated narrative storyline message. The process 500 analyzes the content of the response message to determine whether the received message includes a valid or invalid user-specified storyline option (query task 520). In this regard, the server system can compare the content of the response message against the relevant story data that relates to the current state/status of the storyline. If the received response message contains content that matches (or closely resembles) one of the known candidate storyline options, then the process 500 determines that the response message is valid and the "No" branch of query task 520 is followed. Conversely, if the process 500 cannot link the content of the received response message to any of the known candidate storyline options, then the response message is deemed invalid and the "Yes" branch of query task 520 is followed. If the process 500 detects an invalid user-specified storyline option, then the server system generates a suitably formatted warning message that is intended for the subscriber device (task 522). The warning message may contain appropriate text or media content to notify the user about the invalid response, and to prompt the user to try again. The process 500 may also resend the previous narrative storyline message with the warning message (or following the warning message) to reestablish the current state of the storyline.

This description assumes that the response message contains a valid user-specified storyline option. Accordingly, the process 500 continues by choosing and retrieving the next storyline message, which contains the subsequent portion of the interactive narrative storyline (task 524). The determination and identification of the next storyline message is dictated by the user-specified storyline option received with the response message. The server system can perform task 524 by consulting the stored storyline data, which defines how the story branches at each decision point based on the particular option chosen by the user.

After selecting the next storyline message based on the input received from the user, the process 500 executes any "on-exit" actions for the current/last storyline message (task 526). In this context, an "on-exit action" is similar to an "on-enter" action (described above), except that on-exit actions occur when leaving a story segment or section. On-exit actions can be behind-the-scenes variables set without user knowledge, or playing sounds or rendering visual content that can be experienced by the user. In accordance with one non-limiting example, assume that the NCDS sends the following storyline message: "Dave quickly seals his space suit and desperately looks up at the display. He only has a moment left before decompression, does he take the [toolkit] or the [diagnostic] device?" and that the user responds with "toolkit". For this example, because both options lead to Dave getting sucked out into space from decompression, an on-exit event sets a variable "decompression" to TRUE. Note that on-exit events are called regardless of which decision the user makes, whereas on-enter events are associated with specific user decisions.

At this point, the state/status of the story has been updated, and the process 500 returns to task 504 to set the next storyline message (obtained at task 524) as the current storyline message, and to eventually communicate the next storyline message to the subscriber device. Thereafter, the process 500 continues as described above in an ongoing manner until the user reaches the end of the chapter, the end of the story, or the like. The NCDS is designed such that previous user responses are remembered (as needed) such that subsequent storyline messages remain consistent and accurate with the current state/status of the story, and such that subsequent storyline message do not contain redundant, confusing, or unnecessary user choices. For example, if a previous user response contained "Open Window", then the NCDS will save the window state as "open" and subsequent storyline messages will be generated in an appropriate manner.

In certain embodiments, the server system regulates the timing of communicating the next storyline message based on timing criteria. For example, delivery of narrative storyline messages can be regulated based on user availability data for the user of the particular subscriber device. Such user availability data may include any of the following, without limitation: historical usage data associated with user interaction with previous interactive narrative storylines; calendar data associated with the user; user-specified status data (e.g., "do not disturb" or "busy" or "driving" or "free"); device status information of the subscriber device; or geographical location data associated with the subscriber device. The device status information can include camera data, voice-recognition data, device orientation data, etc. The device status information allows the system to consider things such as: whether the user is actually looking at the device, whether the user has placed the device into a pocket or a purse (if so, stop sending messages), and the like. Alternatively or additionally, the timing criteria can consider the current state/status of the story to enhance the emotional experience of the user. Thus, the delivery of storyline messages can be delayed or expedited as needed to reduce the frequency of device notifications, to increase the likelihood of user participation, to adjust the feeling of suspense, or the like. Alternatively or additionally, the timing of storyline messages can be adjusted to accommodate the delivery of advertisements, marketing literature, coupons, news reports, or other content to the subscribers.

In certain exemplary embodiments, the NCDS allows the user to backtrack and make alternative choices to change the outcome of the current narrative storyline. This feature can be implemented using a devoted "Go Back" button and/or it can be initiated by entering "Go Back" or "Undo" as a reply message. In accordance with one option, the NCDS allows the user to back track at any point in the story, and it does not limit how far the user can go back. In alternative implementations, the NCDS can limit the number of sequential back tracking steps and/or it can restrict the ability to back track such that certain critical decision points cannot be undone.

Referring now to FIG. 8, the multiple user story delivery process 600 is similar to the process 500 in many respects. The process 600, however, involves the delivery of storyline messages to a plurality of different users and the collection and handling of multiple responses messages associated with the decision points in the story. Some of the features, tasks, and functionality of the process 600 are identical or equivalent to that described above in the context of the process 500, and common aspects will not be redundantly described in detail below.

The process 600 determines the initial narrative storyline message (task 602), sets the current storyline message (task 604), executes applicable "on-enter" actions for the current storyline message (task 606), and generates the appropriate content for the different users, based on the current state/status of the story (task 608). Although not always required, the initial storyline message will usually be the same for each user. Thus, the current storyline message for the first iteration of task 604 will usually be the same for each user. Depending on the particular story, the number of users, and the progression complexity of the story, the process 600 can generate and send any number of storyline messages to the different subscriber devices in parallel. For example, the NCDS can support alternative storyline branches that accommodate different user choices such that a plurality of parallel paths are followed by different users. The parallel paths may eventually converge at a common decision point to "align" the storyline among all users, or multiple paths with divergent endings can be supported. These and other scenarios are contemplated by this description. Nonetheless, for simplicity, the following description of the process 600 assumes that the storyline progresses along a common path for all users and all subscriber devices.

The process 600 may continue by generating appropriate content for the users, based on the current state/status of the storyline as maintained by the server system (task 608). The content generated at task 608 can vary from message to message, depending on the current state/status of the storyline. Moreover, the content generated at task 608 may be influenced by the different subscriber device platforms and/or the different messaging services or platforms used by the subscriber devices. In other words, although the primary storyline content may be the same for all users, the content of each storyline message can be enhanced, formatted, or customized for compatibility with the different subscriber devices.

The process 600 continues by preparing and communicating the storyline messages to the subscriber devices assigned to a plurality of different users, via one or more messaging services (task 610). This description assumes that each subscriber device successfully receives a current storyline message and that each subscriber device presents the received message to the respective user (task 612). This example also assumes that the current storyline message calls for a user response, decision, choice, or selection. The server system receives response messages generated from at least two of the subscriber devices, wherein each received response message includes a respective user-specified storyline option selected by the particular user. Ideally, the server system will receive a valid response message from each participating user. In practice, however, the server system can proceed after receiving at least a minimum number of valid response messages (task 614). Alternatively or additionally, the server system can proceed after a specified period of time has elapsed, regardless of how may valid response messages are received.

Each of the received response messages (assuming that they are valid) includes or identifies one of the possible candidate storyline options. The process 600 continues by collecting the storyline options identified in the response messages and performing an appropriate statistical analysis on those storyline options (task 616). The statistical analysis performed at task 616 can be relatively simple or relatively complex, as appropriate to the particular embodiment. For example, task 616 can tally the identified storyline options and choose and retrieve the next storyline message (task 618) based on the storyline option having the highest count. The process 600 may implement a weighted scoring scheme, a tiebreaker methodology, or any suitable algorithm to determine which storyline option will be utilized for purposes of setting the next narrative storyline message to be delivered to the users. In this way, the next storyline message retrieved by the server system is based on the set of response messages received from at least some of the subscriber devices.

The NCDS can support other features and functions that enhance the multiuser experience. For example, the NCDS can send reminders to encourage users to respond to a storyline message that requires a decision. As another example, the NCDS may allow the multiple users to communicate with one another, review response statistics, or the like. The following is an example of an exemplary multiuser story flow, which demonstrates one particular multiple user story delivery scenario.

Justin initiates a 1-4 participant story (titled Epic Journey) from his mobile app, and decides to invite his friends Holly and Terry to join. Justin logs in with his FACEBOOK social media account and uses his friends list to send Holly an invitation. Justin decides to email Terry an invitation, and then initiates the two invites. Justin's mobile app confirms a few different settings with Justin: (1) how long to wait before beginning the story; (2) the minimum number of participants needed before beginning the story; and (3) whether he wants a notification 15 minutes before the story begins, to confirm his preferences. In response to these prompts, Justin enters the following: (1) one hour; (2) one participant; (3) yes, send a notification.

Holly receives a notification on her phone through the FACEBOOK social media platform. Holly is already a registered user of the NCDS and, therefore, she simply logs into her mobile app and accepts Justin's invitation. The story Epic Journey is now added to Holly's library under the "multiplayer" section. Although Holly can participate in the story, she cannot initiate her own set of invites because she does not "own" the story yet. Holly selects "Epic Journey" to begin the story. She reaches the invite screen, which informs her that Terry hasn't accepted yet. She then uses the story chat feature and sends a message asking why Terry hasn't joined. Justin replies that Terry is still at work, and that he will probably accept the invitation when he is available.

Terry is sent an email with instructions on how to accept the shared story, register with the NCDS, and download the associated mobile app. Terry views the invitation email on his phone, follows the embedded links, sets up an account, and downloads the mobile app. Fifteen minutes before the story begins, Justin receives a notification that confirms all invited parties have accepted, and the story is ready. Justin begins reading through the story, which may be delivered in one or more narrative storyline messages. Holly reads through the story at her own pace as well.

Eventually, Terry closes out of his mobile app and leaves the story. Meanwhile, Justin and Holly have each reached the narrative's first decision point on their own. At this point, the group must choose between going to an island or traveling to a town: Justin chooses the island, and Holly chooses the town. After receiving the two response messages, the server system causes the narrative storyline to enter a pending choice state, and a one-hour response timer is set. Justin and Holly can both click on the decision screen and see that Terry has not yet responded. Thereafter, Justin sends Terry a text letting him know that he has only fifteen minutes left to make a choice in the story. Terry sees Justin's text and a notification on his phone reminding him that the Epic Journey story has reached a decision point. If Terry does not respond before the deadline, the mobile app (or the server system) will randomly choose an option for him. Terry decides to log into the mobile app, and he reads the storyline to catch up. Once he reaches the decision point, he can immediately respond or click on the decision screen to see the current voting results.

Terry activates the chat feature and says that he is undecided at this time. Holly reminds Terry that she is his boss, and convinces Terry to select the "go to the town" option. The NCDS responds to the final voting results (the town option) by retrieving the next narrative storyline message and sending it to the three users. The group continues on their way through the narrative until they reach the end of the current chapter. At this point Holly and Terry are prompted by the mobile app to purchase the content so that they can record their response statistics in their own account profiles. Otherwise, they are able to continue reading through the story, but their decisions will not be recorded by the server system in connection with their user profiles.

In accordance with certain embodiments of the NCDS, the server system maintains user profile and status information and updates the information in an ongoing manner as stories play out. To this end, the server system includes or cooperates with a database that includes user profile information. The database may include a choice profile database object for each subscriber, and the choice profile database objects include dynamically updateable user profile data. The user profile data can include or define the behavioral or personality traits, attributes, habits, or tendencies of the user.

The decisions and choices made by each user during the course of a narrative storyline can be captured, saved, and analyzed in any desirable fashion to characterize tendencies, traits, habits, and decision-making behavior of the users. For example, the NCDS can create a group of traits which can be used to track subscriber choices on an account, story, and chapter level basis. The traits and user profile information can be utilized to deliver a personalized profile type for each user, thereby increasing subscriber attachment to their account. The NCDS can also support delivery of a breakdown of decisions on a macro and micro level to give statistics-tracking readers more information to digest, as well as encourage rereads of already purchased content to increase service retention.

In the context of the NCDS, a trait represents a data point that records the moral implications of choosing a particular option or path in a narrative story. To this end, traits should be broad enough to encompass multiple situations and genres, yet specific enough to support an individualized choice profile. For the exemplary embodiment presented here, each trait is characterized by two opposing sides or ends of a spectrum (referred to herein as "aspects" or "attributes"). Any number of traits, with corresponding aspects, can be supported by an embodiment of the NCDS. This particular example maintains and updates three traits for each user: the attitude trait; the analysis trait; and the approach trait. The attitude trait is associated with the extrovert aspect and the introvert aspect, the analysis trait is associated with the logic aspect and the emotion aspect, and the approach trait is associated with the structured aspect and the spontaneous aspect.

The attitude trait represents the subscriber's general approach to social situations and world interactions within their stories. The extrovert aspect (of the attitude trait) can be used for choices that relate to spending one's energy on the outer world, other people, and things. The introvert aspect (of the attitude trait) can be used for choices that relate to spending one's energy on internal ideas, with more focus on their own inner world. The analysis trait relates to how the subscriber goes about processing information, and how they approach weighing options. The logic aspect (of the analysis trait) can be used for choices that represent an objective analysis of the facts associated with an option. The emotion aspect (of the analysis trait) can be used for choices that represent more of a subjective people-oriented approach to an option, taking into account the desires of those involved even if they run contrary to the facts. The approach trait can be utilized for situations within a story that reflect general task-oriented decisions. It also can also be used for split-second action decisions, and how strongly the reader tends toward multitasking. The structured aspect (of the approach trait) can be used for choices that represent conservative or careful planning and a single-mindedness in purpose. The spontaneous aspect (of the approach trait) can be used for choices that represent a more flexible or wild approach, with less focus on a single task and a tendency to "go with the flow" in a less disciplined manner.

Over time, the NCDS will determine which aspects are dominant for each subscriber. For the three-trait example described here, each subscriber can be characterized by a particular combination of three aspects (one aspect taken from each of the three traits of interest). Accordingly, the various combinations of trait aspects can result in eight different "decision profile" types. These decision profile types are labeled and defined as follows:

Director (Extrovert+Logic+Structured)—You are bold and imaginative, and always find a way to accomplish your goals.

Pioneer (Extrovert+Logic+Spontaneous)—You are energetic and extremely perceptive, and truly enjoy living on the edge.

Performer (Extrovert+Emotion+Spontaneous)—You are spontaneous and energetic, and enthusiastically embrace all life around you.

Architect (Introvert+Logic+Structured)—You are clever and strategic, with a plan for every possible outcome.

Executive (Introvert+Logic+Spontaneous)—You are an excellent organizer, unsurpassed at managing things and handling the unexpected.

Visionary (Introvert+Emotion+Spontaneous)—You are astute and curious, and cannot resist an intellectual challenge.

Counselor (Extrovert+Emotion+Structured)—You are quiet and mysterious, and a tirelessly inspirational idealist.

Guardian (Introvert+Emotion+Structured)—You are a dedicated and warm protector, always ready to defend what you care for.

These decision profile types and their corresponding definitions are merely exemplary. In practice, an embodiment of the NCDS can define and employ any desired combination of profile types, which in turn can be influenced by the particular personality traits and associated attributes contemplated by the NCDS.

Traits and aspects are utilized in a narrative storyline by associating them with corresponding storyline choices. When a user chooses an option having a particular aspect "value" or "score" or "flag" attached to it, the corresponding data is recorded in their user profile or account. Moreover, the scoring algorithm can be designed to give more or less weight to certain choices and/or to certain decision points. For example, some decision points in a story may be considered to be very critical or highly indicative of personality traits, ethical tendencies, or the like, while other decision points may be designated to be of lesser importance. The user's profile can utilize this information to develop a particular decision profile type for the user. Note that the authors (storyline creators) can attach more than one trait aspect to an option should it be appropriate to the decision, provided that the aspects do not belong to the same trait. A user's aspect scores can be updated in an ongoing manner, after the completion of a storyline, at the end of each chapter, after a predefined number of choices have been made, or the like. The example presented here adjusts aspect scores at the end of each chapter.

The particular scoring mechanism and algorithm utilized by the NCDS can vary from one embodiment to another if so desired. For the exemplary embodiment described here, trait scores begin at zero and can increase to 1,000 points in either direction toward each aspect on a single continuum. Zero can be considered the midpoint of a sliding scale. For example, the approach trait is associated with a scoring range of Structured=1,000 to Spontaneous=1,000, with a value of zero indicating an approach trait that is neither structured nor spontaneous. Each chapter of a story can contribute up to ten points per trait, and the trait scores can be rounded or truncated if so desired.

Scoring out the trait-tagged decisions from a chapter can be performed by calculating what percentage of each trait was devoted to each aspect of a trait, multiplying the resulting number by ten, and then subtracting the smaller value from the larger value to determine which trait has gained scoring. Although the scoring can be calculated using a variety of different techniques, the exemplary embodiment utilizes the following equation:

((Larger # of Aspect Decisions/Total Trait Decisions)*10)less((Smaller # of Aspect Decisions/Total Trait Decisions)*10)=Score to add to Larger Aspect

EXAMPLE

There are 14 links or choices tagged with the analysis trait in a chapter, and each of those tagged choices is identified as being either a "logic" choice or an "emotion" choice for purposes of aspect scoring. For this chapter, the subscriber made five logic choices, and nine emotion choices. In accordance with the exemplary methodology presented herein: (9/14)=0.64, which means that 64% of the analysis-related decisions were based on the emotion aspect. (5/14)=0.36, which means that 36% of the analysis-related decisions were based on the logic aspect. When multiplied by ten, the results are a 6.4 score for the emotion aspect, and a 3.6 score for the logic aspect. In accordance with the defined subtraction operation, 6.4-3.6=2.8. Accordingly, 2.8 is the resulting chapter score for the emotion aspect, and at the end of the chapter the NCDS adjusts the analysis trait value by 2.8 points toward the emotion side.

Aspects can have different defined intensity levels depending on what score the customer reaches on the 1000-0-1000 scale. These levels can have corresponding descriptions, and achieving different levels can unlock related badges or other features or benefits on the subscriber's account. The embodiment described here includes four different levels per aspect. As an example, the following levels are available for the logic aspect of the analysis trait:

Analysis Logic I (0-250): You rely on your emotional instincts almost as much as your ability to analyze things objectively. But when push comes to shove, you fall back on the facts to make a decision.

Analysis Logic II (251-500): While you'll indulge a hunch when it seems relatively grounded, you more often tend to rely on the facts above instincts and feelings.

Analysis Logic III (501-750): Facts and reason are your allies when it comes to understanding the world around you. Strong emotions can still influence your interpretations, but overall you are steadfast in your conviction that logic is truth.

Analysis Logic IV (751-1000): Emotions and subjectivity have no place in your mental toolkit when it comes to understanding the world around you. The cold hard facts are all that matters.

As with the aspects, the profile types may also have different levels depending on what score the subscriber has obtained within their contributing aspects (akin to a meta-intensity check on top of the aspects). To reach a level in a specific profile type, the subscriber needs to bring each of the corresponding aspects to the designated level. The embodiment described here includes four different levels for each profile type. As an example, the following levels are available for the Director profile type, which was summarized above:

Novice Director (Requires Extrovert, Logic, and Structured aspects all at Intensity Level I): You occasionally are outspoken and have a strong desire to forge your own path. You seek to accomplish your goals, but often follow the rules when doing so.

Associate Director (Requires Extrovert, Logic, and Structured all at Intensity Level II): You often speak your mind and will strike out on your own if it seems more efficient. Accomplishing your goals is important, and you might even bend the rules to make them happen.

Senior Director III (Requires Extrovert, Logic, and Structured all at Intensity Level III): More often than not you'll voice your opinion, regardless of who the audience is. You goals are extremely important to you. The ends typically justify the means.

Master Director (Requires Extrovert, Logic, and Structured all at Intensity Level IV): Speaking your mind is second nature, whether it's the right forum or not is irrelevant. You'll achieve your goals at all costs and flatten those who oppose you.

Due to the branching nature of the narrative stories, it is likely that subscribers will read through content multiple times. To accommodate multiple re-reads, the breakdown of trait scores should be recorded separately for each re-read of a chapter. However, only scores from the most recently completed reading of a chapter will count toward the account's choice profile type. This will prevent users from reading the same content over and over again in an attempt to max out a trait score.

The NCDS can also maintain a Stories to Trait Max Ratio (STM Ratio), which is a formula to calculate the number of complete stories it would take a subscriber to reach the maximum level in any one single trait aspect. Note that this formula assumes that the subscriber consistently makes choices which contribute to one trait aspect. Users who are less consistent will take more time; the greater the inconsistency the greater the time to reach the maximum (if it happens at all). One exemplary methodology is as follows:

Max Trait Points per Chapter: 10
Average Chapters per Story: 8
Average Trait Points per Story: 80
Total Trait Score to Max: 1000
STM Ratio (Total Trait Score to Max/Average Trait Points per Story): 12.5 Stories (or 100 Chapters)

When a user restarts a chapter they have already read, they should be given a notification that upon completion the scores from their most recent reading will erase the previous reading's scores. At this point they have the option to either proceed with their reread or decline to begin it.

Figure 9:
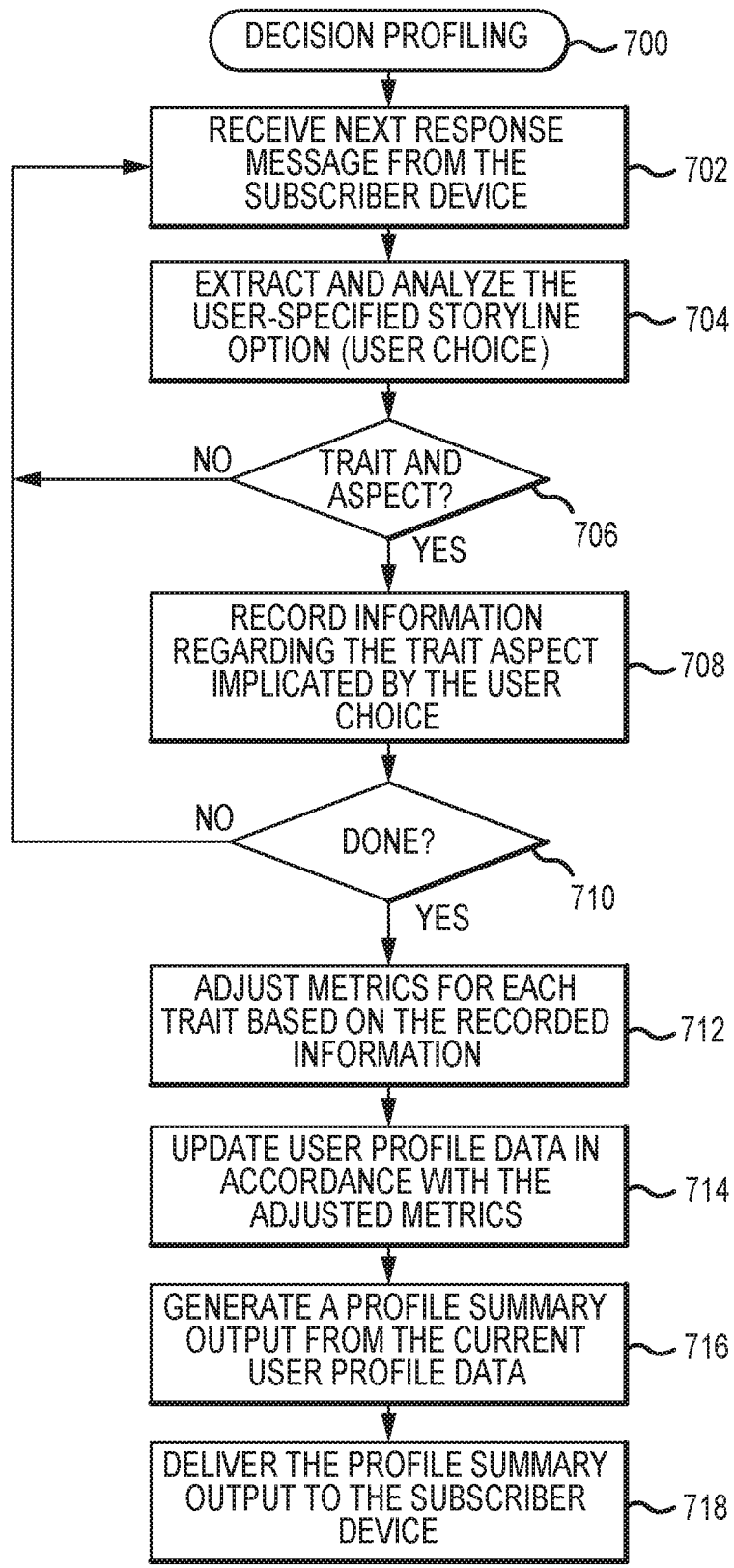
FIG. 9 is a flow chart that illustrates an exemplary embodiment of a decision profiling process.

FIG. 9 is a flow chart that illustrates an exemplary embodiment of a decision profiling process 700, which may be performed by the NCDS described above. The process 700 can be performed in conjunction with the single user story delivery process 500 and in conjunction with the multiple user story delivery process 600. This description assumes that the NCDS includes or cooperates with a suitably configured database having choice profile database objects for the subscribers, as described above. The database objects include dynamically updateable user profile data corresponding to the trait aspect scores for the subscribers.

For the illustrated embodiment, the decision profiling process 700 receives a response message from the subscriber device (task 702) and extracts and analyzes the user-specified storyline option (i.e., the user choice) from the response message (task 704). As mentioned above, certain choices are tagged with trait and aspect information, and other choices are void of such information. Accordingly, the process 700 checks whether the user choice includes trait and aspect information (query task 706). If not, then the process 700 exits and returns to task 702 at an appropriate time to consider the next response message (if any). This description assumes that the user choice conveyed in the received response message includes trait and aspect information (the "Yes" branch of query task 706). Accordingly, the server system records information regarding the trait aspect that is implicated by the user choice (task 708). For example, the server system can save the aspect type (Extrovert, Introvert, Logic, Emotion, Structured, or Spontaneous) and a score, value, or metric associated with the user choice. In accordance with the methodology outlined above, the server system keeps a simple count for each aspect type, and the counts are processed at the end of each chapter.

The process 700 can continue receiving response messages and recording the trait aspect information for any desired amount of time, for any number of response messages, or for any portion of the story. In this regard, the process 700 can return to task 702 (the "No" branch of query task 710) any number of times to collect additional trait aspect data. This example assumes that the trait aspect data is collected and saved for analysis at the end of each chapter. Thus, if the process 700 is done collecting the trait aspect information (the "Yes" branch of query task 710), then the server system can adjust the metrics or score for each trait based on the recorded information (task 712). In this way, the server system can update the user profile data over time, in accordance with the adjusted metrics or scores (task 714). The updated user profile data will therefore be influenced by at least some of the response messages received by the server system for the particular user.

The updated/current user profile data can be used to generate a profile summary output for the user (task 716). The profile summary output may include any of the following information, without limitation: statistics related to the choices made by the user; the current scores or values for each trait (based on the 0-1000 scale mentioned above); the level reached for each trait aspect; the current decision profile type of the user; and the particular level of the profile type. The process 700 continues by delivering, communicating, or otherwise presenting the profile summary output to the subscriber device (task 718) such that the subscriber can view the output. In certain embodiments, the profile summary output is made available on the user's profile page, which is accessible via the NCDS application that resides on the subscriber device.

Narrative Content Authoring Tool

As explained above, each story provided by the NCDS can include a large number of variations, contingencies, options, and endings that are influenced by user decisions and preferences. Consequently, the creation of a narrative storyline to be supported by the NCDS can be a complex, time consuming, and cumbersome exercise. The following description relates to an exemplary computer-based authoring tool that can be manipulated by a content creator to generate narrative storylines of the type presented herein. The authoring tool can be implemented as a local client application, a web or cloud based application, or the like. In certain preferred embodiments, the authoring tool leverages GUI elements that make it easy to create, organize, edit, and save content associated with a narrative storyline.

The authoring tool can be realized as a suitably configured application that allows authors to easily create, visualize, and manipulate a library of stories designed for the NCDS. In the context of the authoring tool, a narrative story that can be delivered by the NCDS usually includes a collection of many different types of components, along with multiple instances of those component types. For the example described here, the components include the following types, without limitation: Story; Chapter; Passage; Text Blocks; Links; Conditionals; Actions; and Flags. A story can include one or more chapters, each chapter can include a plurality of different passages, and each passage includes at least one text block. The links, conditionals, actions, and flags are components that are used to define and configure the narrative storyline flow.

Story—In the context of the authoring tool, the story component represents a wrapper or a container surrounding the content, information, and metadata related to a particular narrative storyline. A story is analogous to a book in that it can include multiple chapters if so desired; a story defines the complete narrative experience for the reader. Accordingly, the story component represents a container for the chapter components that define a story, and the story component may include metadata such as "Story Name" and "Author Name". For the exemplary embodiment presented here, there is only one story component or element associated with each narrative storyline. Consequently, a story component is the highest level component for a narrative storyline.

Chapter—A chapter conceptually defines a narrative episode that is somehow connected to the larger overall narrative experience. In the context of the authoring tool, the chapter component represents a wrapper or a container surrounding all of the data associated with a single chapter in a narrative storyline. Accordingly, each chapter component represents a container for the passage components that define that corresponding chapter. In this regard, the chapter component can include metadata such as "Chapter Name". A story will usually have a plurality of chapters, although some stories may be void of chapters (i.e., a story can be a single-chapter experience). In accordance with the embodiments presented here, chapters are sequential within a story and a user is only allowed to progress from one chapter to the next one in the defined order (the NCDS does not allow a user to move backwards from the current chapter to any previous chapter). Moreover, the exemplary embodiment of the NCDS does not permit users to "jump" across a transition from one chapter to another. For these reasons, a chapter as defined herein is more than a conceptual break in a narrative storyline—a chapter can be considered to be a functional module in that it represents a self-contained "ecosystem" of passages having certain functional rules attached thereto. Indeed, each chapter component is preferably realized as a distinct standalone object, which can be marketed and provided to readers in an individualized form if so desired. In most scenarios, however, all of the chapter components are packaged and organized together with the corresponding story. A chapter can be configured or written by linking multiple passages together.

Passage—In the context of the authoring tool, the passage component represents a container or logical structure that encompasses a single instance of deliverable content. A passage can be a collection of different text objects (without or without other media object types), wherein the passage links to at least one other passage via some association with the different text objects. For an implementation that uses a text messaging app as the delivery mechanism, a passage can be delivered as one or more individual text messages to be rendered on the reader's mobile device. From the messaging app's perspective, a passage is a single consumable piece of content that can include written content, image content, video content, audio content, animation, active links, or any combination thereof. Accordingly, a passage component encompasses all of the potential text and actions that are used to generate the corresponding content and the corresponding current state of a narrative storyline when the reader encounters or visits the storyline passage defined by that passage component. Depending on how the storyline is authored, a reader may be presented with a particular passage as a result of different storyline states, outcomes, story paths, etc. Accordingly, the authoring tool can handle entry into a passage via multiple states (if so desired).

The exemplary embodiment described herein supports at least three types of passages: start passages; normal passages; and end passages. Each chapter of a story begins with a start passage and finishes with an end passage. A start passage contains the initial text content delivered to the reader to begin a chapter. Consequently, each chapter includes only one start passage. Start passages only contain outgoing links (i.e., links that lead to another passage). In other words, start passages contain no incoming links. Normal passages include both incoming and outgoing links, because they appear "between" a start passage and an end passage. A chapter can include any number of normal passages. An end passage contains the final text content that is delivered to the reader to close a chapter. Thus, end passages only contain incoming links (i.e., links that originate at another passage). Notably, a chapter can include any number of different end passages to contemplate different narrative storyline paths.

Text Blocks—In the context of the authoring tool, a text block component is associated with text that can be rendered with a passage. In this regard, a text block represents an individual excerpt of text that can be associated with a given passage. A text block can have conditions associated therewith that dictate whether or not the text content is shown to the reader. A text block can have one or more (or zero) actions associated therewith. Moreover, a text block can have one or more (or zero) links associated therewith. Actions and Links are described in more detail below. As used herein, a "text group" is a collection or container of one or more text blocks, wherein at most only one of the text blocks within a text group is valid at any time when a reader encounters or visits the corresponding passage. Although not practical or efficient, it is possible for a text group to include only one text block. A text group may include text subgroups defined therein if so desired; text groups can be arranged in a hierarchical structure as needed. A passage can be created with any number of individual text blocks and any number of text groups arranged in any desired logical order. Thus, although there might be different possible messages that can be presented for a given passage, the actual text content that is actually displayed is determined by the current state of the storyline, user choices, and the like.

Links—In the context of the authoring tool, a link allows the author to control what choices are available to a reader. A link may also be used to define which passage to display next, based on the choices made by the reader. In this regard, links represent the mechanism by which the NCDS transitions from one passage to the next. Accordingly, links are associated with the user selectable options and choices. In certain embodiments, links are associated with link text that is displayed on or near selectable buttons, active text, or the like.

Conditionals—In the context of the authoring tool, conditionals are attached to text to determine whether any given text should be displayed. The authoring tool allows the author to attach any number of conditionals to individual text blocks. The conditionals dictate whether or not displayable content is actually delivered, based on the current state of the narrative storyline. For the implementation described here, conditionals check flags for specified values to determine whether they succeed or not, i.e., to determine whether or not the conditionals are satisfied. Flags are described in more detail below. As an example, if a character has a jug of water (one condition) and he looks at a plant (another condition), then the system delivers the following text content: "Water the plant?" In contrast, if the character does not have the jug of water, then the system delivers: "A plant is on the table."

Actions—In the context of the authoring tool, actions can be executed when a user first encounters a passage or when the user makes a choice and transitions from the current passage to another passage. It should be appreciated that these actions are designated by the author of the narrative storyline; they are not user-initiated or character-initiated commands, instructions, or operations. In practice, actions are executed by the NCDS when the user enters or exits a passage, i.e., transitions from one state to another. Actions can be used to set or modify flag values to create a persistent state for the narrative storyline as the reader progresses through the story. Thus, the NCDS responds to an action by changing a state and/or by changing the status of one or more flags. As an example, the action "set as complete" can be associated with items such as "possess water jug" or "door is open" or "the bottle is broken". As another example, assume that a passage refers to a gun sitting on a table, and that the user chooses to pick up the gun. In response to that user choice, the following action is executed when the NCDS transitions out of the passage: HAS_GUN=1. Execution of this action updates the state of the narrative storyline, such that going forward the NCDS knows that the user is in possession of the gun.

Flags—In the context of the authoring tool, flags represent the construct that indicates, defines, or sets the state of the narrative storyline. For the embodiments described here, flags are created, added, modified, or set via actions as a reader progresses through the storyline. Flags are used in conditionals to determine whether individual text excerpts are displayed or hidden when a reader encounters a given passage. In practice, a flag can refer to: something the user has done (ran down the street: STREET=1); something that the user possesses or does not possess (HAS_JACKET=1; HAS_SKATEBOARD=0); an activity or action that has been completed (SHOT_MONSTER=1); or the like. A simple narrative passage need not have any action nor any flag associated therewith. For example, a strictly storytelling passage can simply transition to another passage without modifying, setting, or creating any flag.

Each of the components mentioned above has a corresponding visual element within the authoring tool, which allows the author to easily visualize, track, rearrange, and create the flow of the narrative storyline. These benefits will become apparent from the description that follows, and in view of FIGS. 10-20.

The authoring tool is suitably configured with a full submission flow that allows the author to submit a narrative storyline to the NCDS (or any publisher) when appropriate. Submission involves the sending of the file(s) generated by the authoring tool to one or more servers of the NCDS. In addition to the storyline file(s), the author can attach and upload any other relevant files such as image files, video files, audio files, or the like. In accordance with certain embodiments, the submission of narrative storyline content will notify editors of the new narrative storyline, and will enable the editors to review the content, make comments and suggestions to the author, and set the content (which may be revised, edited, or annotated) to be returned to the author the next time they login. The author can subsequently respond to the comments and suggestions and resubmit an updated version of the narrative storyline as needed.

In certain embodiments, the authoring tool includes or cooperates with a debugger function that works in conjunction with the storyline visualization present in the authoring tool editor. The debugger feature allows an author to easily step through their storyline and visualize the current state as well as what the current passage and current texts within that passage are. The debugger feature provides the ability to easily change the existing storyline state to view the results in real-time, which in turn allows the author to find and fix any logical issues with the flow of the storyline.

The embodiment of the authoring tool described here utilizes a plurality of user interfaces that can be quickly and easily selected and switched as needed. Although not always required, the primary interfaces include, without limitation: a story interface; a chapter interface; and a passage interface. Each of these interfaces supports a variety of operations, functions, and actions that are appropriate for the respective storyline level (e.g., the story level, the chapter level, or the passage level). The different interfaces are described in more detail in the following sections.

Story Interface

Figure 10A:
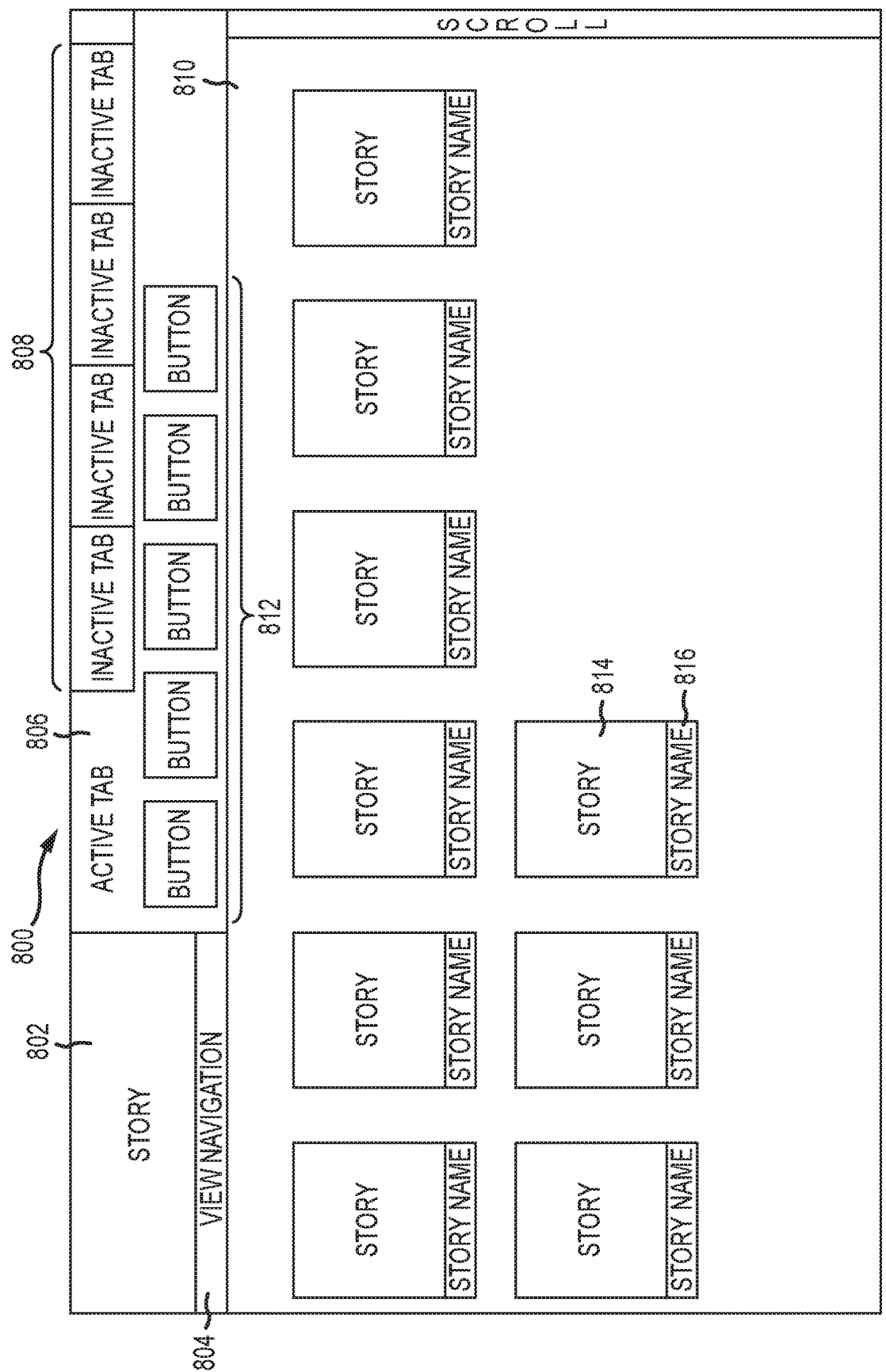
FIG. 10A is a simplified representation of a story interface screen generated by an exemplary embodiment of an authoring tool.

FIG. 10A is a simplified representation of a story interface screen 800 generated by an exemplary embodiment of an authoring tool. The story interface screen 800 can be the first screen that is rendered after launching the authoring tool. The story interface screen 800 is personalized in that the user (author) can run commands and view statistics on each story they have saved using the authoring tool. The layout and arrangement of user interface (UI) elements in the story interface screen 800 might vary from one implementation to another, and the layout and arrangement are customizable in some implementations. The illustrated embodiment of the story interface screen 800 includes at least the following UI elements, without limitation: a view name element 802; a view navigation element 804; an active tab element 806; a number of inactive tab elements 808; and a story list element 810. The view name element 802, the view navigation element 804, the active tab element 806, the inactive tab elements 808, and the overall appearance of the story interface screen 800 are shared with the other user interface screens supported by the authoring tool (e.g., the chapter interface screen and the passage interface screen).

The view name element 802 renders, displays, or otherwise identifies the currently viewed story level. For this example, the view name element 802 displays "Story" or "Chapter" or "Passage" as needed to reflect the currently displayed level. Accordingly, "Story" is displayed in the view name element 802 for the story interface screen 800. The view navigation element 804 can be implemented as a drop-down menu or any suitably configured module that allows the user to change/select the currently viewed story level. For this particular example, the view navigation element 804 displays one of the options shown below, depending on the currently viewed story level. Clicking the name of an interface level within the view navigation element 804 navigates the user to the selected level.

Story
Story>Chapter
Story>Chapter>Passage

The story interface screen 800 employs tabs to organize and group commands and functions. Any number of tabs can be provided with the story interface screen 800. The active tab element 806 includes a label that identifies the name of the currently selected tab. The inactive tab elements 808 may also include respective labels that identify the names of the currently unselected tabs. Clicking an inactive tab element 808 converts the selected tab into the current active tab. The active tab element 806 includes a number of buttons 812 that can be selected by the user to carry out commands, functions, and/or operations that are associated with the active tab element 806. Some exemplary tabs and related button functions are described in more detail below.

The story list element 810 is a field that identifies the stories (if any) authored by the user. The story list element 810 can be selectively configured to display an icon view or a list view (and/or perhaps other view modes as appropriate to the particular embodiment). The icon view displays the stories using icons that resemble book covers. The list view displays the stories as rows of a list, wherein each row can include sortable columns of detailed information related to the respective story. The icon view (which is shown in FIG. 10A) is the default view. As depicted in FIG. 10A, each story can be represented by a story icon 814 (e.g., an image) and a corresponding story name 816 (e.g., a text label that identifies the title of the story). Selecting (clicking once) a story in the story list element 810 highlights the selected story; thereafter, commands initiated at the story interface screen 800 are applied to the selected story. Double-clicking a story in the story list element 810 launches the chapter interface screen for the selected story.

In accordance with certain embodiments, detailed information related to a story can be viewed from the story list element 810. For example, the detailed story information can be provided in columns of a list view, or it can be accessed by a hover-over pop up window when using the icon view. Alternatively or additionally, the detailed story information can be accessed by right clicking on a displayed story icon 814 in the icon view. The story information includes relevant metadata, as well as certain statistics that can be useful to authors. The story information can include any of the following, without limitation:

Story Name: the title of the story
Story Description: a brief description or summary of the story
Genre: one or more genre tags can be selected or designated for the story
Author: the name of the author
Last Edited: the date or timestamp that indicates when content was last edited
Chapters: the total number of chapters in the story
Passages: the total number of passages in the story
Words: the total word count of the story
Shortest Path: the lowest "shortest path number" from all chapters in the story
Average Number Of Words Per Passage: self-explanatory
Average Number Of Words Per Text Block: self-explanatory As mentioned above, the story interface screen 800 includes different selectable tab elements 806, 808, and each tab element 806, 808 can include any number of tab buttons 812 rendered therewith. The exemplary embodiment described here supports at least the following tabs, without limitation: Home; File; Edit; Review; and View. Commands linked to the tab buttons 812 affect the selected object relevant to the present view. For example, clicking a button 812 labeled "New" in the story interface screen 800 creates a new story. In contrast, clicking a button 812 labeled "New" in the chapter interface screen creates a new chapter in the corresponding story. In practice, any buttons 812 that are not relevant or applicable to the present view should appear grayed out to indicate to the author that they have no current function.

Home Tab—The home tab is unique in that it is a fully customizable tab element that the author can use to dock specific buttons on. It is also the default tab to be displayed when the authoring tool is opened. To dock a specific button on the home tab, the author simply needs to drag its icon from the original location to the home tab. Dragging a button to the home tab does not remove it from its original tab location. In certain embodiments, the home tab is pre-populated with some default buttons, all of which appear on other tabs as well. These default buttons include, without limitation:

New: creates a new object
Save: saves the current object
Save As: saves the current object as a new object with a new name
Debug Mode: begins playback of the narrative storyline from a selected passage in the debug interface screen File Tab—The file tab includes at least the following buttons, without limitation:

New: creates a new object
Open: opens the current object
Save: saves the current object
Save As: saves the current object as a new object with a new name
Submit: submits the current story to the NCDS and updates the status of the story
Preferences: personalization, view, and theme options Edit Tab—the edit tab includes at least the following buttons, without limitation:

Cut: cuts the current object
Copy: copies the current object
Paste: pastes the copied or cut object
Delete: deletes the current object
Rename: opens the rename option on the current object
Select All: selects all objects on the current view
Modify Info: opens the edit window for object information (story interface screen and chapter interface screen only)

Review Tab—the review tab includes at least the following buttons, without limitation:

Find: locates object text based on string input
Replace: replaces object text based on string input
Spelling: reviews nodes for spelling errors (passage interface screen only). If a single node is selected, then only the selected node will be checked. If no node is selected, then all nodes of the chapter will be checked
Review Mode Toggle: toggles the review mode on and off (the review mode is described in more detail below)
Find Next Comment: auto-populates the passage interface screen's edit pane with the first available passage that has a text block with a comment saved to it. This command activates the review mode if it is not already active, auto-expands the review bar for the first comment in the passage, and saves the current comment (if already viewing one) and moves to the next comment View Tab—the view tab includes at least the following buttons, without limitation:

Custom Sort: opens a multi-level sort option (story interface screen and chapter interface screen only)
Passage Layout: choose between node layout options (passage interface screen only)
Free Place: passages rest at the focused cursor location when moved or created
Snap-To-Grid: graphical blocks that represent passages will snap to the nearest grid when moved or created FIG. 10B depicts an alternative embodiment of a story interface screen 818. FIG. 10B shows a state where the story titled "Little Red Riding Hood" is selected. In response to the selection of a story, a story details pane 820 is populated with information that is specific to the selected story. For this particular example, the story details pane 820 includes the following user-selectable or user-generated information (which appears top-down in FIG. 10B): a book cover image; the name or title of the story; the name of the author; a brief description or summary of the story; the genre of the story; the URL or file location of the book cover image, e.g., a URL associated with a content delivery network or content management service; and the URL or file location to be used to purchase or access the story, e.g., a URL associated with a third party service provider, a social media platform, a web-based reseller, or the like. The illustrated embodiment of the story interface screen 818 also includes an information section 822 that contains story information, which may include any of the story information described above.

Chapter Interface

Figure 11A:
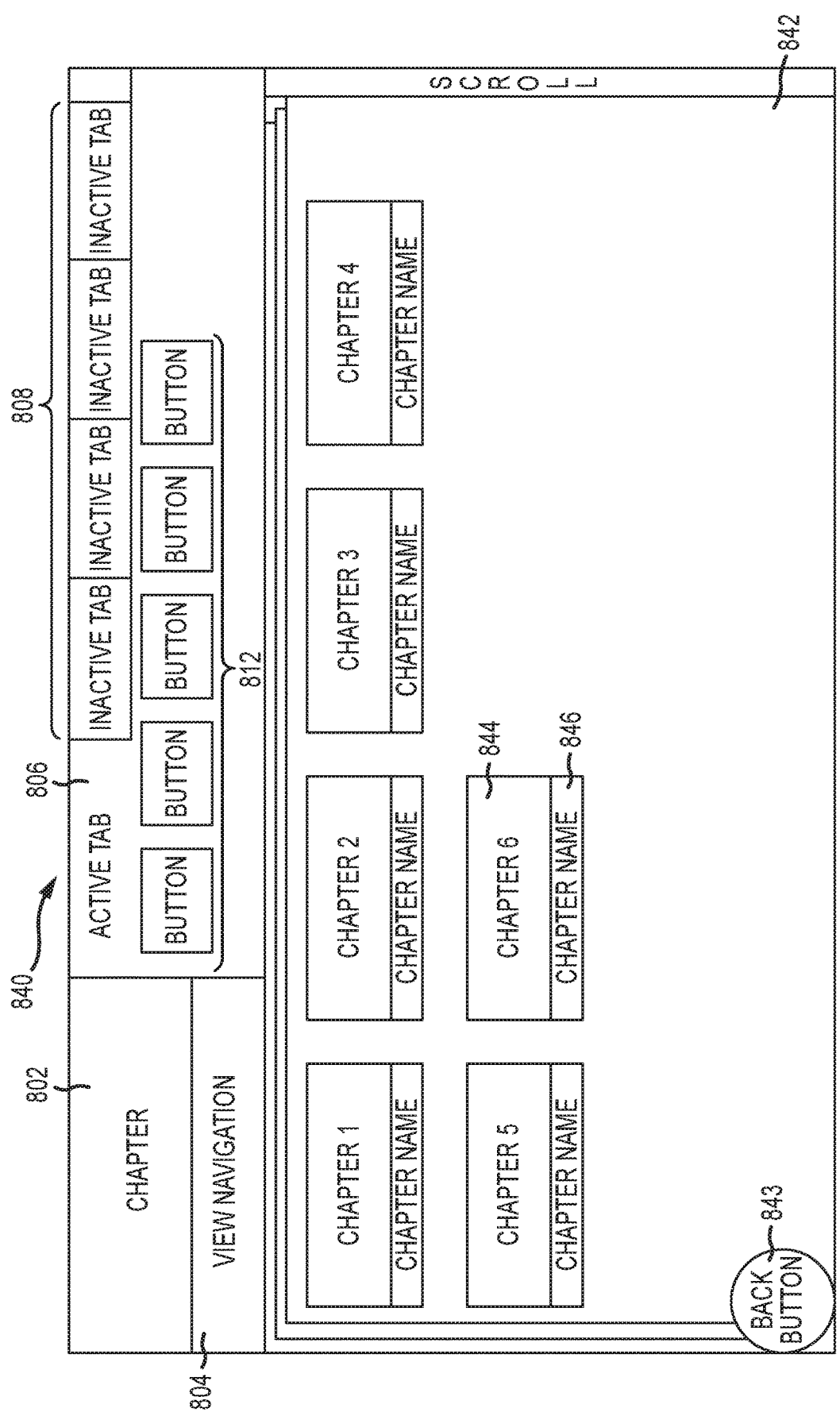
FIG. 11A is a simplified representation of a chapter interface screen generated by an exemplary embodiment of an authoring tool.

FIG. 11A is a simplified representation of a chapter interface screen 840 generated by an exemplary embodiment of an authoring tool. Each story has a corresponding chapter interface screen 840, which enables the author to run chapter-specific commands, and to view metadata and statistics related to chapters. The layout and arrangement of UI elements in the chapter interface screen 840 might vary from one implementation to another, and the layout and arrangement are customizable in some implementations. The exemplary chapter interface screen 840 shown in FIG. 11A includes at least the following elements, which were described above with reference to the story interface screen 800: the view name element 802; the view navigation element 804; the active tab element 806; inactive tab elements 808; and buttons 812 rendered with the active tab element 806. The chapter interface screen 840 also includes a chapter list element 842 (rather than the story list element 810) and a back button 843 that can be used to go back to the story interface screen 800. The UI elements that are shared with the story interface screen 800 will not be redundantly described here in the context of the chapter interface screen 840.

For the chapter interface screen 840, the view name element 802 displays "Chapter" to indicate the currently active storyline level. The background of the chapter interface screen 840 and/or the background of the chapter list element 842 can be selected such that it is visibly distinguishable from the other primary interface screens. For example, the background of the chapter list element 842 might resemble the interior of a book, or it might represent multiple documents that are stacked or overlapping one another. The chapter list element 842 is a field that identifies the chapters of the currently selected story. The chapter list element 842 can be selectively configured to display an icon view or a list view (and/or perhaps other view modes as appropriate to the particular embodiment). The icon view displays the chapters using icons, and the list view displays the chapters as rows of a list, wherein each row can include sortable columns of detailed information related to the respective story. The icon view depicted in FIG. 11A is the default view. As depicted in FIG. 11A, each chapter can be represented by a chapter icon 844 and a corresponding chapter name 846 (if applicable). Selecting (clicking once) a chapter in the chapter list element 842 highlights the selected chapter; thereafter, commands initiated at the chapter interface screen 840 are applied to the selected chapter. Double-clicking a chapter in the chapter list element 842 launches the passage interface screen for the selected chapter.

In accordance with certain embodiments, detailed information related to a chapter can be viewed from the chapter list element 842. For example, the detailed chapter information can be provided in columns of a list view, or it can be accessed by a hover-over pop up window when using the icon view. Alternatively or additionally, the detailed chapter information can be accessed by right clicking on a displayed chapter icon 844 in the icon view. The chapter information includes relevant metadata, as well as certain statistics that can be useful to authors. The chapter information can include any of the following, without limitation:

Chapter Name: the title of the chapter

Chapter Description: a brief description or summary of the chapter

Last Edited: the date or timestamp that indicates when content was last edited

Chapter Number: the chapter order number

Passages: the total number of passages in the chapter

Words: the total word count of the chapter

Figure 11B:
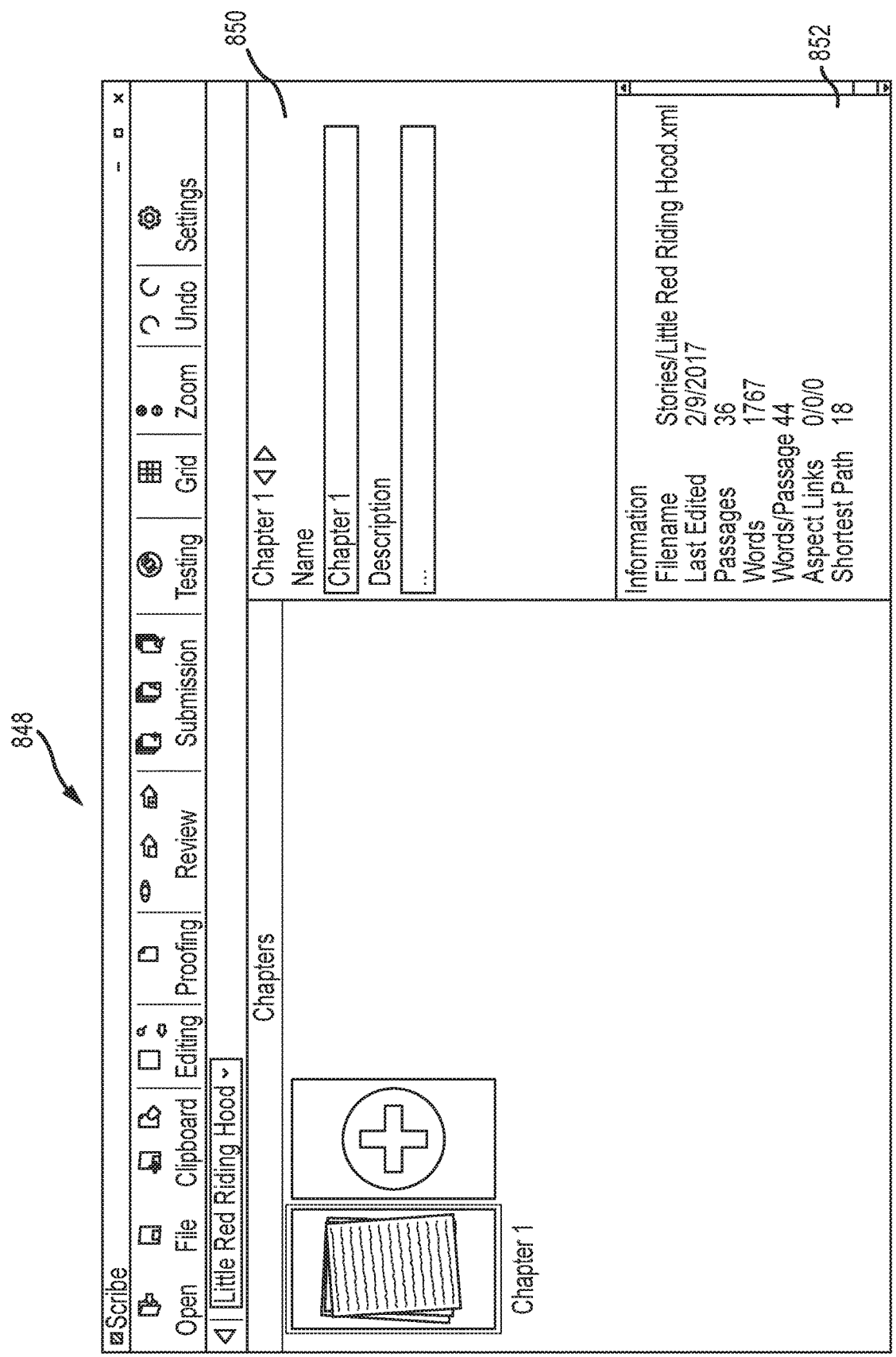
FIG. 11B is a simplified representation of another chapter interface screen generated by an exemplary embodiment of an authoring tool.

Shortest Path: the shortest path from the start passage to the nearest end passage Average Number Of Words Per Passage In The Chapter: self-explanatory Average Number Of Words Per Text Block In The Chapter: self-explanatory FIG. 11B depicts an alternative embodiment of a chapter interface screen 848.

FIG. 11B shows a state where Chapter 1 of "Little Red Riding Hood" is selected. In response to the selection of a chapter, a chapter details pane 850 is populated with information that is specific to the selected chapter. For this particular example, the chapter details pane 850 includes the following user-selectable or user-generated information (which appears top-down in FIG. 11B): the name or title of the chapter; and a brief description or summary of the selected chapter. The illustrated embodiment of the chapter interface screen 848 also includes an information section 852 that contains chapter information, which may include any of the chapter information described above.

Passage Interface

Figure 12A:
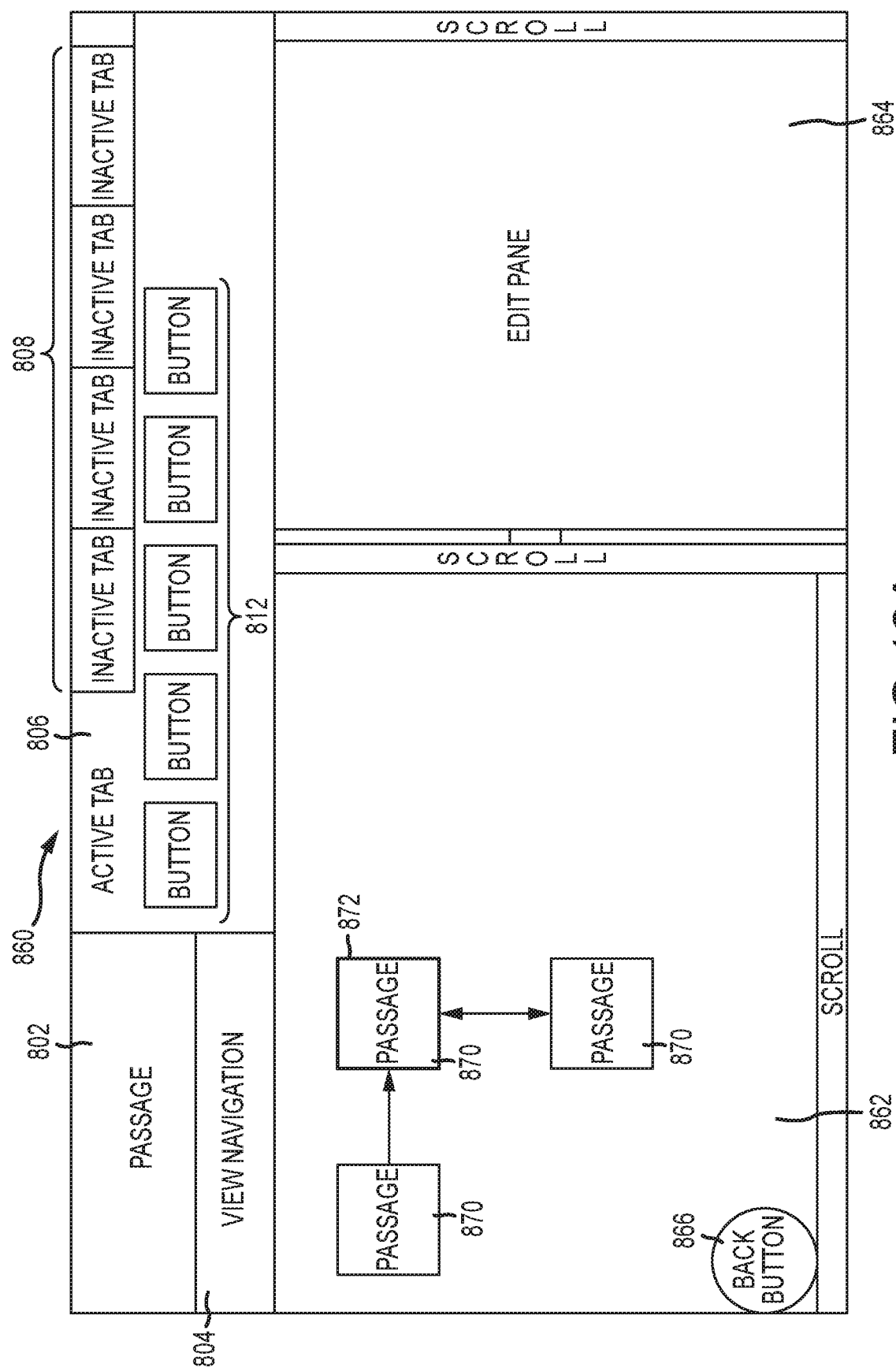
FIG. 12A is a simplified representation of a passage interface screen generated by an exemplary embodiment of an authoring tool.

FIG. 12A is a simplified representation of a passage interface screen 860 generated by an exemplary embodiment of an authoring tool. Each chapter has a corresponding passage interface screen 860, which enables the author to run passage-specific commands, and to view metadata and statistics related to passages. The passage interface screen 860 is where the author crafts and designs the actual progression through the narrative storyline. The visualization presented in the passage interface screen 860 reinforces the actual flow of the chapter for the author.

The layout and arrangement of UI elements in the passage interface screen 860 might vary from one implementation to another, and the layout and arrangement are customizable in some implementations. The exemplary passage interface screen 860 shown in FIG. 12A includes at least the following elements, which were described above with reference to the story interface screen 800: the view name element 802; the view navigation element 804; the active tab element 806; inactive tab elements 808; and buttons 812 rendered with the active tab element 806. The passage interface screen 860 also includes, without limitation: a passage layout element 862; an edit pane 864; and a back button 866 that can be used to go back to the chapter interface screen 840. The UI elements that are shared with the story interface screen 800 will not be redundantly described here in the context of the passage interface screen 860.

For the passage interface screen 860, the view name element 802 displays "Passage" to indicate the currently active storyline level. The sizes of the passage layout element 862 and the edit pane 864 can be adjusted by moving the pane divider that separates their respective areas. The passage layout element 862 is a graphical workspace that enables the author to insert, move, and delete passages as needed, create links between passages, and otherwise arrange the passages in the chapter. The edit pane 864 is a UI module where all passage text and action editing takes place. For the exemplary embodiment described here, the edit pane 864 is active for a passage that is selected or focused in the passage layout element 862. In alternative embodiments, the edit pane 864 can be suitably configured to support batch editing of a plurality of passages.

As depicted in FIG. 12A, each passage is represented by a passage icon 870. Although not shown in FIG. 12A, each passage icon 870 preferably includes a passage name or label, along with at least some of the text content associated with that particular passage. In practice, the text content rendered with a passage icon 870 can be scrollable or it can be expandable (via a hover-over element or a pop-up element) to facilitate viewing of the entire excerpt. The authoring tool supports different zoom levels for displaying passages in the passage layout element 862. The displayed size of the passages gets progressively smaller to help facilitate visualizing large chapter layouts. For example, at the default viewing size of 1× magnification, each passage icon 870 includes the passage name and at least some of the passage text. In contrast, at 0.5× magnification, only the passage names are visible due to the reduced size of the passage icons 870. At the smallest size of 0.25× magnification, the passage icons 870 are displayed without any text or labels.

In accordance with the exemplary embodiments described here, the visual characteristics of the passage icon 870 indicate the type and/or status of the passage. In this regard, the outline color, the fill color, the outline pattern, and/or the fill pattern can identify the passage type. For example, the outline color of a passage icon 870 may be selected based on the following (or any appropriate) scheme: green for start passages; black for normal passage; purple for end passages; and red for broken passages, which are passages having broken or unintelligible links, improper actions, incorrect operators, or the like. Selecting (clicking once) a passage in the passage layout element 862 highlights the selected passage with a bold outline or in any appropriate manner, and causes the edit pane 864 to be populated with information and UI elements associated with the selected passage. FIG. 12A shows a selected passage 872 having a bold outline; for simplicity and ease of illustration, however, FIG. 12A does not show the edit pane 864 populated with items for the selected passage 872.

The passage interface screen 860 enables the user to create and establish links between passages. The links are rendered as directional arrows between two passages, where the arrows indicate the transition from one passage to another. One-way links are represented by single-headed arrows. A one-way link indicates that the reader has no option to return to the preceding passage from the new passage. Two-way links are represented by double-headed arrows to indicate that the reader can move back and forth between the two linked passages.

Passages rendered in the passage layout element 862 are interactive in that they can be moved around in the layout using a mouse or other pointing device. The author can pick up, move, drag-and-drop, area select, and click to view the passage content in the edit pane 864. In certain embodiments, moving passages within the passage layout element 862 does not affect any established passage links; the visualization of the links can be updated in a dynamic manner in response to changes in the layout of the passages.

Figure 12B:
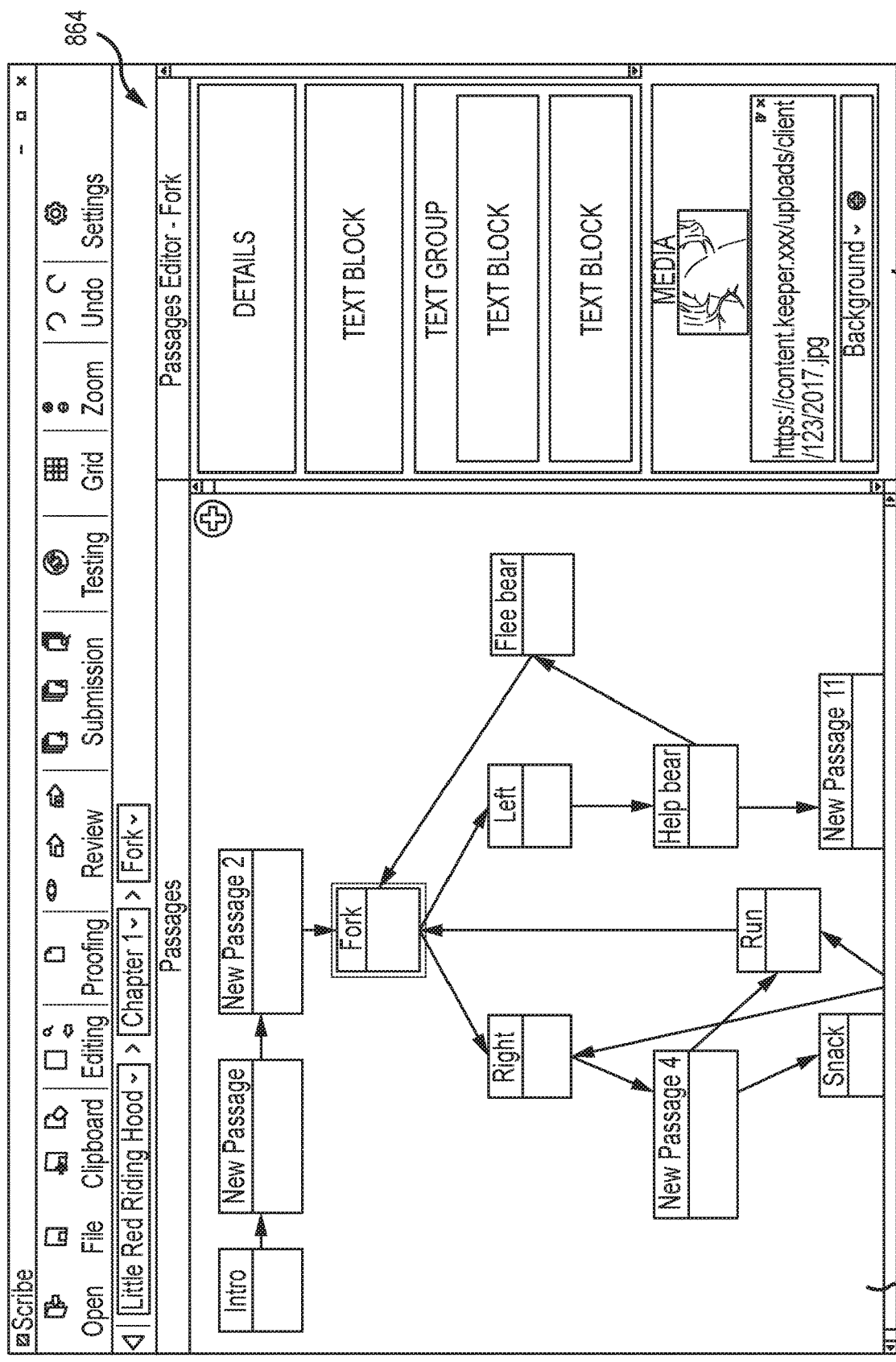
FIG. 12B is a simplified representation of another passage interface screen generated by an exemplary embodiment of an authoring tool.

FIG. 12B depicts an alternative embodiment of a passage interface screen 874. The passage layout element 862 displays twelve passages with corresponding links that interconnect the different passages. FIG. 12B shows a state where the passage titled "Fork" is selected. In response to the selection of a passage, the edit pane 864 is populated with information that is specific to the selected passage. For this particular example, the edit pane 864 includes sections related to passage details, passage text, and passage media. The passage details may include, without limitation: the title or name of the selected passage; and a brief description or summary of the passage. The passage text section includes all text blocks and text groups for the selected passage. The passage text section contains all of the possible text excerpts that can be shown to the reader when that passage is reached. The conditions attached to the text blocks and/or to the text groups will determine whether or not a given text excerpt will be shown. Although not always required, the exemplary embodiment described here checks the text blocks and text groups in a particular order, e.g., top-down as they appear in the edit pane 864. The passage media section includes images, video clips, audio clips, and the like, along with their corresponding URLs or file locations. The illustrated embodiment of the passage interface screen 874 also includes a field 876 that allows the author to add a background image or wallpaper to the passage.

Figure 13:
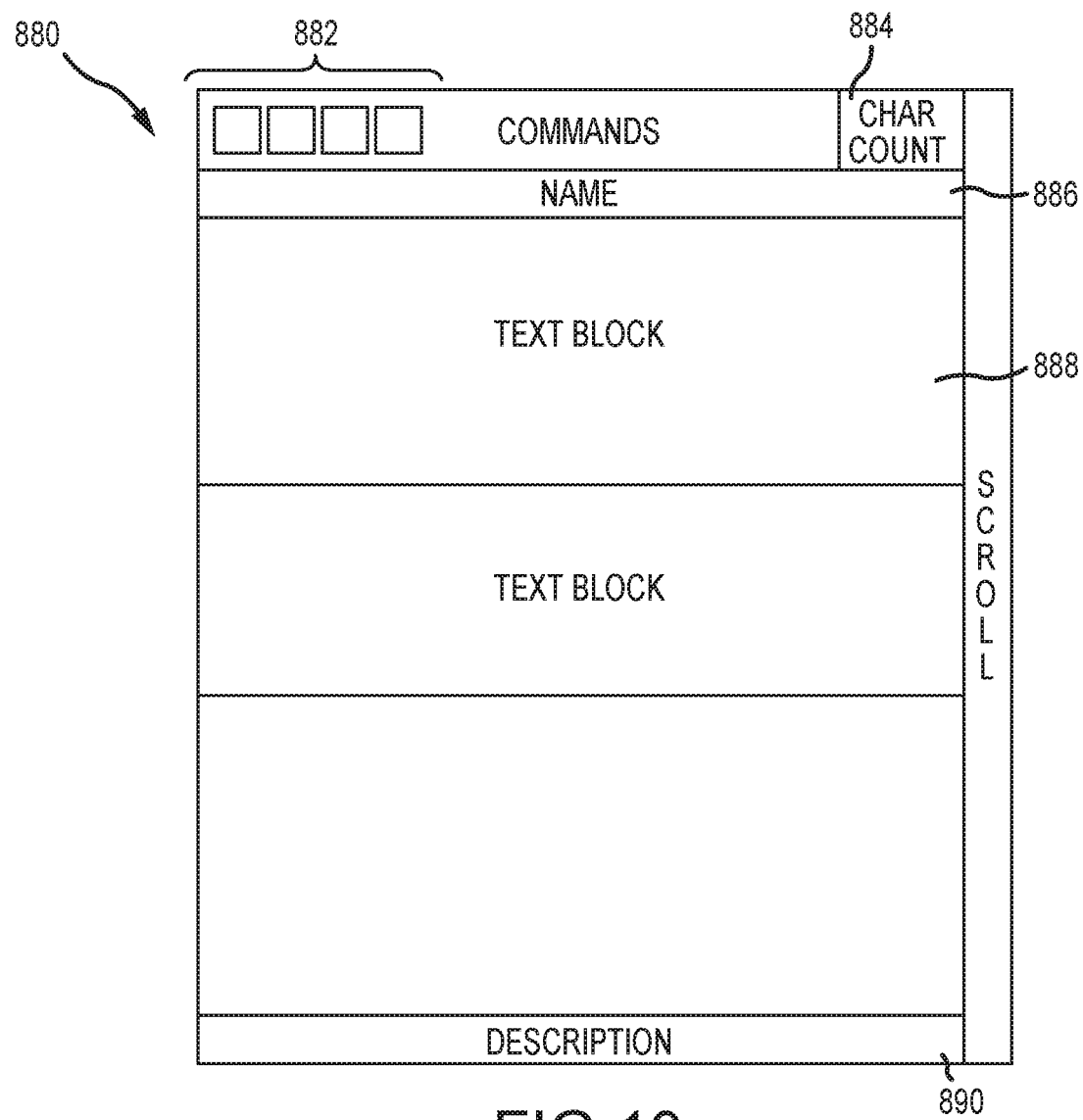
FIG. 13 is a simplified representation of an edit pane generated by an exemplary embodiment of the authoring tool.

FIG. 13 is a simplified representation of an edit pane 880 generated by an exemplary embodiment of the authoring tool. The edit pane 880 can include one or more components that represent the content associated with the particular passage being edited. For this example, the edit pane 880 includes at least the following items: a plurality of command buttons 882; a character count field 884; a passage name field 886; one or more text blocks 888 (which may be individual blocks or grouped into one or more text groups as described above with reference to FIG. 12B); and a description field 890. Although not shown in FIG. 13, the edit pane 880 can include additional UI elements that define or describe the content that is to be associated with the selected passage. In this regard, the edit pane 880 can include: all of the potential text content that can be delivered to the reader arranged in individual blocks, groups of blocks, or the like; non-text media such as images, audio, video, backgrounds, and hyperlinks; and any other information that might be relevant to the selected passage. The layout and arrangement of the edit pane 880 corresponds to merely one example; an embodiment of the authoring tool can utilize alternative configurations for the edit pane 880 if so desired.

The command buttons 882 correspond to commands that can be run on individual text blocks, multiple text blocks, one or more text groups, or the entire passage. The available commands assigned to the command buttons 882 include, without limitation:

Cut: cuts selected object(s)
Copy: copies selected object(s)
Paste: pastes selected object(s)
Delete: deletes selected object(s)
Set As Start: sets the entire passage as a chapter start passage The character count field 884 is used to display a character count. If nothing in the edit pane 880 is selected, then the character count field 884 displays the total of all potentially customer-facing characters in the passage. If one or more text blocks 888 are selected, the character count field 884 displays the total of all potentially customer-facing characters in the selected text blocks 888. If a text group is selected, the character count field 884 displays the total of all potentially customer-facing characters in the selected text group.

The passage name field 886 is used to display the name of the passage, which can be used for purposes of passage linking. In this regard, changing the name of the passage automatically updates any existing links that point to the renamed passage.

The illustrated example depicts only two individual text blocks. In practice, however, the combination of all text blocks and text groups contained in the edit pane 880 represents all of the text that can possibly be delivered to the reader for that particular passage. Moreover, a "higher level" text group may include any number of text groups. There is no limit to the number of text groups that can be contained within another text group. As mentioned above, multiple text blocks can be sent in one message to the reader if their conditions are met.

The description field 890 is an optional item that can be used internally by the author to add a description, a label, or other identifier for the passage. If the author enters a description for the passage, it will appear in the description field 890.

Figure 14:
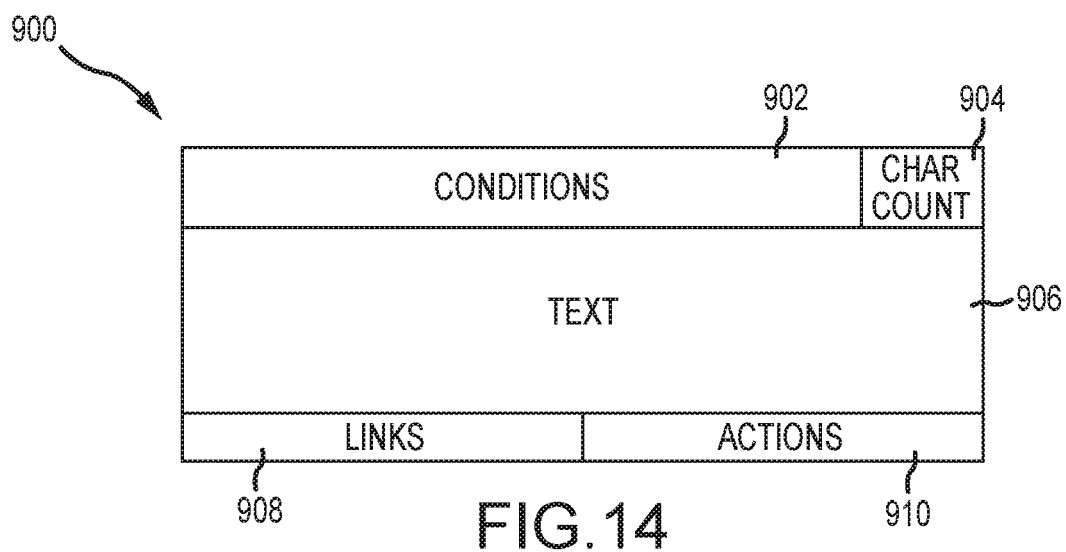
FIG. 14 is a simplified representation of a text block generated by an exemplary embodiment of the authoring tool.

FIG. 14 is a simplified representation of an individual text block 900 generated by an exemplary embodiment of the authoring tool. Text blocks are associated with sections of passage text. Passages can display any number of text blocks to the customer, depending on how their viewing requirements are set up (see the description of conditions below for more details). There are two ways of setting up text blocks: individual or grouped. In an individual text block, any conditions on the block are evaluated independently of everything else in the passage. In a text group (i.e., a collection of text blocks), the conditions on each text block in the group are evaluated from top to bottom, until one text block is found whose conditions are met. When the system finds a text block with satisfied conditions, it stops evaluating any other text blocks within the group and uses the valid one. Accordingly, the author must take care when ordering text blocks within a text group.

FIG. 14 depicts a single individual text block 900. The authoring tool can render a text group as a plurality of individual text blocks 900 surrounded by a common boundary, a container, or the like. The text block 900 can include one or more components associated with the particular passage being edited. For this example, the text block 900 includes at least the following items: a conditions field 902; a character count field 904; a text field 906; a links field 908; and an actions field 910. The conditions field 902 contains any conditions that are applied to the text block 900. The character count field 904 displays the count of all potentially customer-facing characters in the text block 900. The text field 906 contains the text to be displayed to the reader if the conditions in the conditions field 902 are met. The links field 908 contains any links that are contained in the block. The actions field 910 includes any actions (flags or auto-advance) in the block. In this context, the actions are run after sending a message corresponding to the text block 900.

Links and Traits

As mentioned above, navigation between passages can be accomplished by inserting links into the passage text. For this example, links are implemented as keywords that, when sent to the NCDS server by the customer after the current passage text is received, will then indicate navigation to a new passage—after which the relevant destination passage text is received. In accordance with the exemplary embodiment described here, links are displayed as bracketed text within a received passage.

Figure 15:
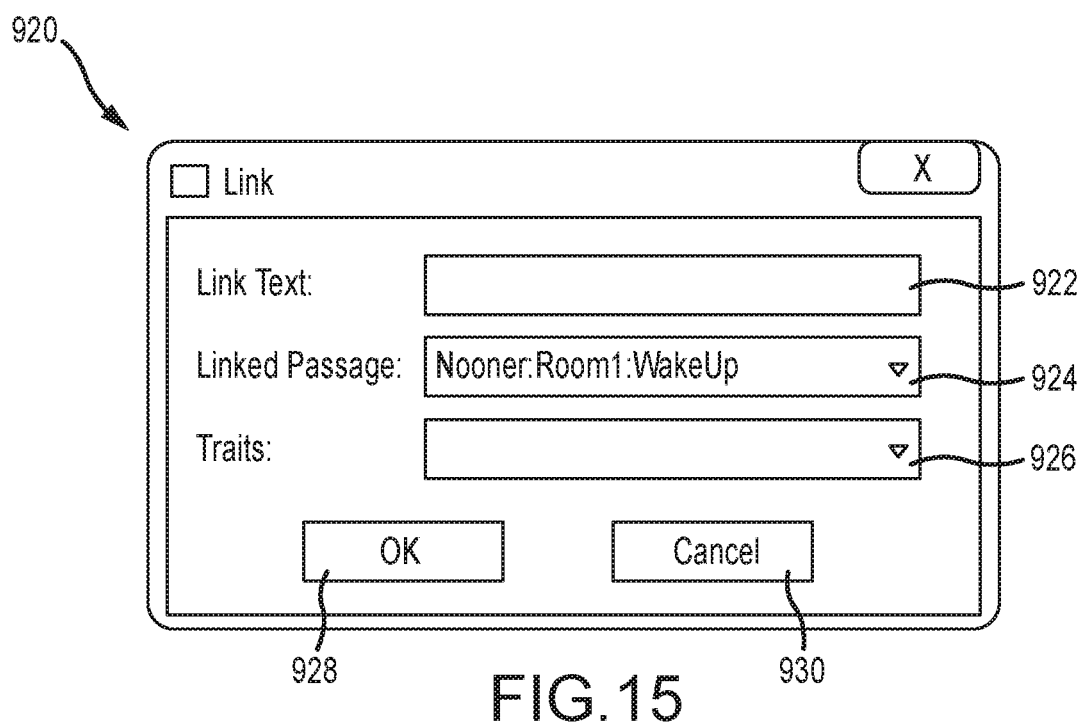
FIG. 15 is a simplified representation of an insert link pop-up window generated by an exemplary embodiment of the authoring tool.

In certain implementations of the authoring tool, links are created by selecting the text that should appear in brackets, and then using either a right-click context command or a button 882 (see FIG. 13) to select an "Insert Link" command. Selection of the Insert Link command results in the display of a pop-up window that includes the link details. In this regard, FIG. 15 is a simplified representation of an insert link pop-up window 920 generated by an exemplary embodiment of the authoring tool. The depicted embodiment of the insert link pop-up window 920 includes, without limitation: a link text field 922; a linked passage field 924; a traits field 926; an OK button 928; and a cancel button 930.

The link text field 922 is populated with the text that is to be used for the linking of passages. For this particular example, the link text field 922 includes the text to be displayed in brackets when the message is delivered to the reader. As mentioned above, the content of the link text field 922 can be auto-populated in response to the author selecting or highlighting one or more words contained in a text block before initiating the Insert Link command. The linked passage field 924 identifies the name of the passage that is linked by the link text. In certain embodiments, the linked passage field 924 is implemented as a selectable drop-down menu that includes a list of linkable passages that have already been created by the author. The traits field 926 can be used to identify any traits that are to be associated with the link. In certain embodiments, the traits field 926 is implemented as a selectable drop-down menu that includes a list of available traits that can be assigned to the link. In such an implementation, the drop-down menu of the traits field 926 can be manipulated to assign one or more traits and their associated attributes to the link (see the above description of traits and attributes).

Figure 16:
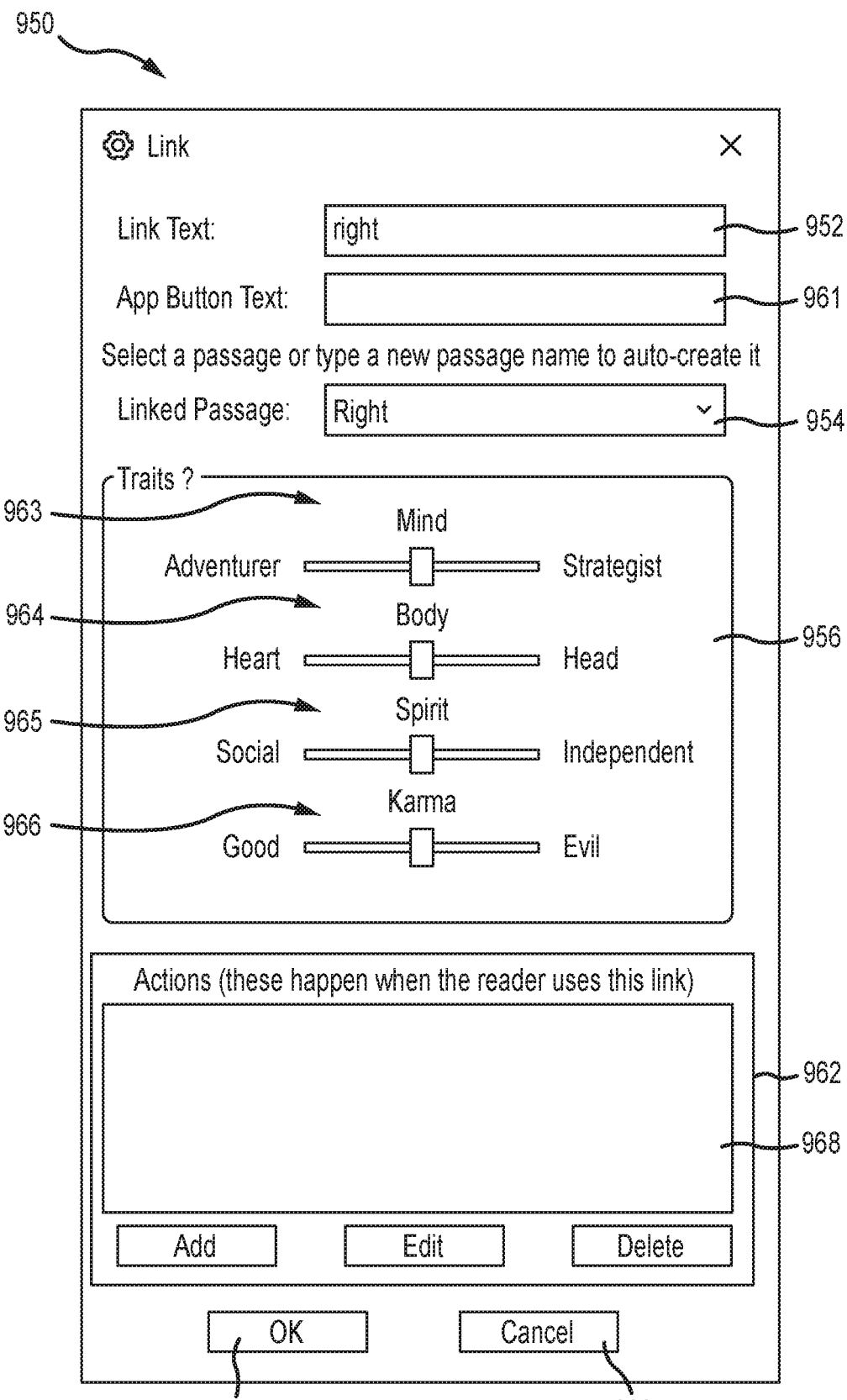
FIG. 16 a simplified representation of an alternate version of an insert link pop-up window generated by an exemplary embodiment of the authoring tool.

FIG. 16 is a simplified representation of an alternate version of an insert link pop-up window 950 generated by an exemplary embodiment of the authoring tool. The depicted embodiment of the insert link pop-up window 950 includes, without limitation, the following elements that are equivalent or analogous to counterpart elements found in the insert link pop-up window 920: a link text field 952; a linked passage field 954; a traits field 956; an OK button 958; and a cancel button 960. FIG. 16 depicts the link text field 952 and the linked passage field 954 populated with their respective strings. For this example, the word "right" would appear in brackets when the passage is delivered to the reader, and the passage identified by the string "Right" is entered if the reader selects "right" as the response option. The illustrated embodiment of the insert link pop-up window 950 also includes: an app button text field 961, which can be used to identify the label rendered on a selectable button displayed on the mobile app; and an actions module 962, which can be used to associate actions with the link.

In accordance with the embodiment shown in FIG. 16, the traits field 956 includes at least one UI element, each of which enables the author to designate a score, weight, grade, or any suitable metric corresponding to a personality trait that is monitored by the NCDS for the users. The embodiment of the NCDS described above keeps track of the following personality traits: Attitude; Analysis; and Approach. As another example, the exemplary embodiment associated with FIG. 16 keeps track of the following four traits: Mind; Body; Spirit; and Karma. For this reason, the traits field 956 contains a Mind setting tool 963, a Body setting tool 964, a Spirit setting tool 965, and a Karma setting tool 966. Each of these tools is implemented as an adjustable slider having limits defined by the respective attributes of the traits. Thus, the Mind setting tool 963 has limits defined by Adventurer and Strategist, the Body setting tool 964 has limits defined by Heart and Head, the Spirit setting tool 965 has limits defined by Social and Independent, and the Karma setting tool 966 has limits defined by Good and Evil. It should be appreciated that the traits field 956 need not use adjustable sliders for these tools, and that other configurable UI elements can be used instead of or in addition to sliders (e.g., radio buttons, text-entry fields, drop-down menus, or the like).

FIG. 16 depicts all of the tools 963, 964, 965, 966 in their neutral positions, i.e., each adjustment slider is at its midpoint. Thus, the Mind setting tool 963 is positioned such that following the link (as configured) has no influence on the user's Mind trait—following the link does not indicate any Adventurer or Strategist tendencies. If, however, the Mind setting tool 963 is adjusted toward the Adventurer end, then the NCDS will adjust the user's Mind trait to reflect adventurous tendencies if the narrative storyline follows the link. Conversely, if the Mind setting tool 963 is adjusted toward the Strategist end, then the NCDS will adjust the user's Mind trait to reflect strategic tendencies if the narrative storyline follows the link. The position of the slider along the Mind scale determines whether or not the link is associated with Adventurer or Strategist characteristics and, if so, to what extent the link influences the adjustment or modification of the user's Mind trait score or grade. The tools 963, 964, 965, 966 can be designed with any desired resolution, i.e., to select any number of values between the two endpoints. The author can adjust any of the tools 963, 964, 965, 966 (or none of them if so desired) in this way to configure the manner in which the NCDS scores/adjusts the respective trait attributes in response to a user following the link. As explained above, the NCDS can use any suitable algorithm, formula, or scoring mechanism to adjust each user's trait profile.

The actions module 962 allows the author to add, edit, and delete actions associated with the link created by the insert link pop-up window 950. As explained above, an action associated with a link is performed or executed by the NCDS when the reader chooses to follow that particular link. The author can manipulate the actions module 962 to designate and define the actions associated with the link. The actions module 962 includes an actions list field 968 that displays the actions associated with the link. The author can click the "Add" button to define an action for the link. After creating an action, it will appear in the actions list field 968.

As explained above, a given passage can have any number (within practical limitations) of associated links, and different links may implicate the user's trait profile in different ways. Accordingly, the author can use the insert link pop-up window 920, 950 multiple times to create a plurality of different links for the same passage. Notably, the different links can be created such that different selectable options (links) implicate the reader's personality traits in different ways throughout the flow of the narrative storyline.

Actions and Flags

The NCDS utilizes flags as a form of data storage for stories and chapters. Flags indicate data values or storyline status under an author-defined name, and can be referred back to at any time. Flags persist at their appropriate level, depending on which type of flag is utilized, and can be used in multiple ways. Flags have many purposes including, without limitation: keeping track of what the reader has chosen and accomplished; managing other narrative states;

storing inventory items; and the like. Flags can also be displayed to the user by putting them into deliverable text. The exemplary embodiment of the NCDS utilizes two types of flags: chapter flags and story flags. Chapter flags persist only through a given chapter, and chapter flag names are required to be unique only within the respective chapter. In contrast, story flags persist throughout a story. Accordingly, story flag names must be unique across the entire story.

Figure 17:
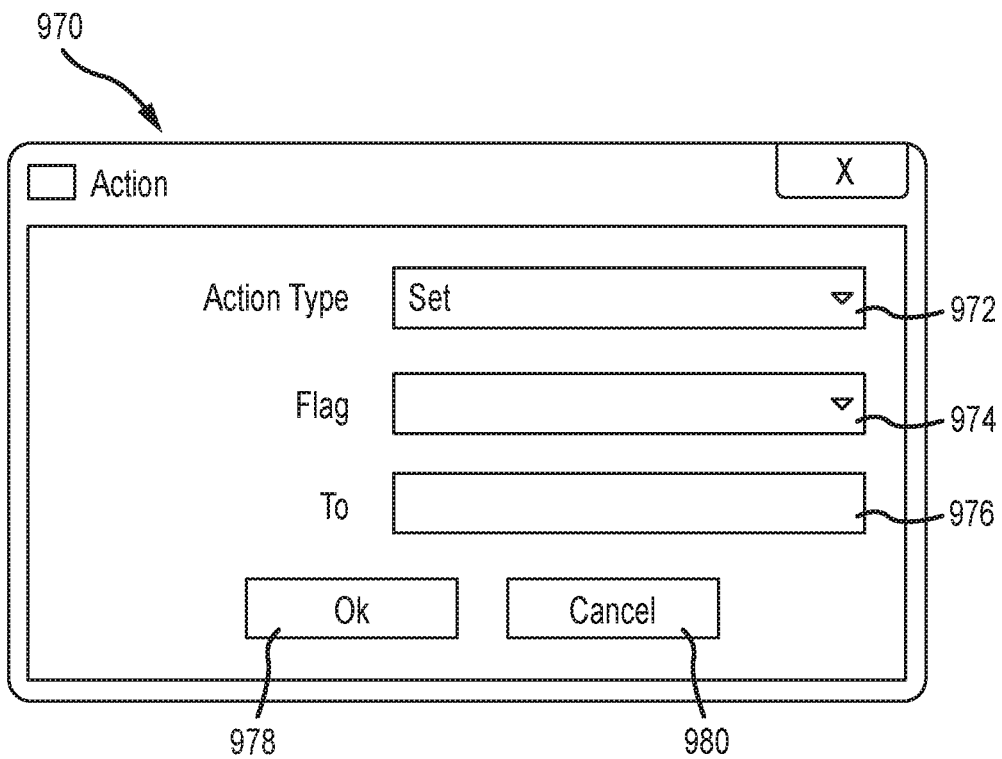
FIG. 17 is a simplified representation of an add action pop-up window generated by an exemplary embodiment of the authoring tool.

Flags are created by the author selecting the text block where the flag should be set, then using either a right-click context function or a text block button to select an appropriately labeled function, such as an "Add New Action" function. In accordance with certain embodiments, the actions module 962 (see FIG. 16) accommodates the creation of new actions/flags. In this regard, clicking the "Add" button of the actions module 962 results in the display of a pop-up window that includes details needed to create an action. In this regard, FIG. 17 is a simplified representation of an add action pop-up window 970 generated by an exemplary embodiment of the authoring tool. The depicted embodiment of the add action pop-up window 970 includes, without limitation: an action type field 972; a flag name field 974; a modifier value field 976 (labeled "To" in FIG. 17); an OK button 978; and a cancel button 980.

The add action pop-up window 970 enables the author to add the relevant parameters needed for flags. In this regard, the action type field 972 identifies whether the action is: Set; Increment; or Decrement. In certain embodiments, the action type field 972 is implemented as a selectable drop-down menu that includes a list of the different action types. The action type "Set" modifies the value of the specified flag and, if no such flag exists, it will be created. The action type "Increment" increases the value of the specified flag by the amount defined in the modifier value field 976. The action type "Decrement" decreases the value of the specified flag by the amount defined in the modifier value filed 976. The flag name field 974 is a character entry field that enables the author to create a name for the flag. For this embodiment, the flag name filed 974 includes a drop-down list that displays the names of any existing flags. This can be helpful to avoid duplicating flag names. The modifier value field 976 is a character entry field that enables the author to enter a modifier value to be associated with the flag. In practice, the modifier value field 976 should be designed to accept strings and numbers.

Once the author presses the OK button 978, the authoring tool inserts a small flag icon below the respective text block to indicate that a flag has been set. The color of the displayed flag icon is preferably coded to indicate the action/flag type. For example, a blue flag icon is displayed for the action type "Set", a green flag icon is displayed for the action type "Increment", and a red flag icon is displayed for the action type "Decrement". It should be appreciated that other action/flag types can be contemplated by an embodiment of the authoring tool. Moreover, any scheme for identifying the different action/flag types can be utilized in an embodiment of the authoring tool.

The authoring tool also supports the use of auto-advance actions. An auto-advance action is used when the text block should send its content, as well as the linked auto-advance passage's text, automatically without customer input. Auto-advance actions can be used to create a sequence of purely narrative passages that are delivered without any user feedback or interaction.

Conditions

Figure 18:
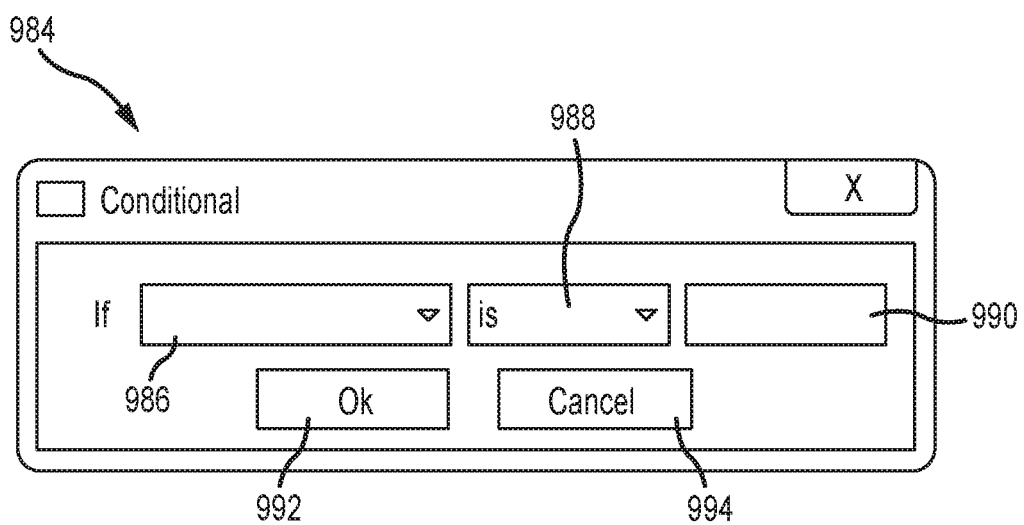
FIG. 18 is a simplified representation of an insert conditional pop-up window generated by an exemplary embodiment of the authoring tool.

In a narrative storyline with multiple paths where certain events may or may not occur, it is important to be able to send the reader different blocks of text from a single passage which reflect these variables. Conditions represent the gatekeepers for the different deliverable text content, utilizing various statement types that check specified flag values to determine which text content is appropriate to send. For the exemplary embodiment described here, conditions are created by the author selecting the text block that will be subjected to the check, and then using either a right-click context command or a text block command button to select an appropriately labeled function, such as an "Insert New Condition" function. Selection of Add New Condition results in the display of a pop-up window that includes details needed to create a conditional. In this regard, FIG. 18 is a simplified representation of an insert conditional pop-up window 984 generated by an exemplary embodiment of the authoring tool. The depicted embodiment of the insert conditional pop-up window 984 includes, without limitation: a flag identifier field 986 (labeled "If" in FIG. 18); an operator field 988; a check value field 990; an OK button 992; and a cancel button 994.

The insert conditional pop-up window 984 enables the author to add the relevant parameters needed for conditions. In this regard, the flag identifier field 986 identifies the flag to check. In certain embodiments, the flag identifier field 986 is implemented as a selectable drop-down menu that includes a list of all available flags within the story and within the respective chapter. The drop-down menu makes it easy for the author to identify and select the flag to be associated with the new conditional. The operator field 988 identifies a particular conditional operator to be used for the new conditional. In certain embodiments, the operator field 988 is implemented as a selectable drop-down menu that includes a list of the available conditional operators that can be chosen. The check value field 990 is a character entry field that enables the author to enter a value to check against. In practice, the check value field 990 should be designed to accept strings and numbers.

Once the author presses the OK button 992, the authoring tool creates and applies the new conditions as defined by the author. More specifically, all text content within the respective text block becomes subject to the defined conditions. If the conditions pass, the text content is sent to the reader. If the stated conditions are not satisfied, then the associated text content is not delivered.

Condition Types

The type of condition check that occurs is controlled automatically, based on where the text block is positioned relative to other text blocks for the passage. As explained above, the location of text blocks and text groups in the edit pane 864, 880 influences the manner in which their conditions are checked. In accordance with the exemplary embodiment presented here, an individual text block is always evaluated with a "When" condition. In this context, a When condition sets a conditional that does not run the hook if the condition is false. A text group will evaluate the top block in a group with a When condition. Any following blocks within that group will be evaluated with an "Otherwise When" condition. Any text block without a condition will be simply evaluated as "Otherwise". Note that an "Otherwise" text block should be the last block in a text group or in the passage, as once it displays the text group will stop evaluating any remaining blocks. The first text block that passes its condition check will be displayed. Accordingly, only one block from a text group will be delivered and displayed at one time.

The Otherwise When condition is evaluated if the previous block did not meet its conditions. The Otherwise condition displays its text content if the previous blocks did not meet their conditions.

The authoring tool supports the following conditional operators, without limitation:

"is" evaluates to true if both sides are equal, otherwise returns false.

Example: $bullets is 5

"is not" evaluates to true if both sides are not equal.

Example: $friends is not $enemies

">" evaluates to true if the left side is greater than the right side.

Example: $money>3.75

">=" evaluates to true if the left side is greater than or equal to the right side.

Example: $apples>=$carrots

"<" evaluates to true if the left side is less than the right side.

Example: $shoes<$people*2

"<=" evaluates to true if the left side is less than or equal to the right side.

Example: 65<=$age

As with text blocks, there are two ways of setting up conditions: individual or grouped. An individual condition is evaluated independently of other conditions assigned to the passage. Grouped conditions are evaluated on an "Or" basis, in that the condition group passes if any one of the conditions in the group is met. In contrast, "And" is how individual conditions are evaluated against other individual or grouped conditions.

Review Mode

Review mode is a mode authors and editors can activate in the authoring tool as needed. The review mode permits users to pass comments on text blocks back and forth, with the goal of assisting the editorial process. The changes in the UI which occur, as well as any additional functionality, are described in more detail below.

As mentioned with reference to FIG. 12A and FIG. 12B, passages can be displayed as icons within the passage layout element 862. When the review mode is active, passages with text blocks that have comments in them are shaded based on their state. The purpose of this is to permit the user to quickly determine which passages are subject to comments. Although any type of shading/color scheme can be utilized by the authoring tool, the exemplary embodiment employs the following color-based scheme: yellow (new); red (read); orange (response sent); and green (comments resolved). A yellow colored passage indicates that a new comment has been added to that passage, but it has not yet been viewed. A red colored passage indicates that all comments on that passage have been read, but not yet responded to. An orange colored passage indicates that a response has been received for the most recent comment. A green colored passage indicates that the comments have been resolved, and that no additional responses are necessary. In preferred implementations, comment status is updated automatically based on who is viewing it. Note that a user cannot mark a comment they submitted themselves as "viewed".

Figure 19:
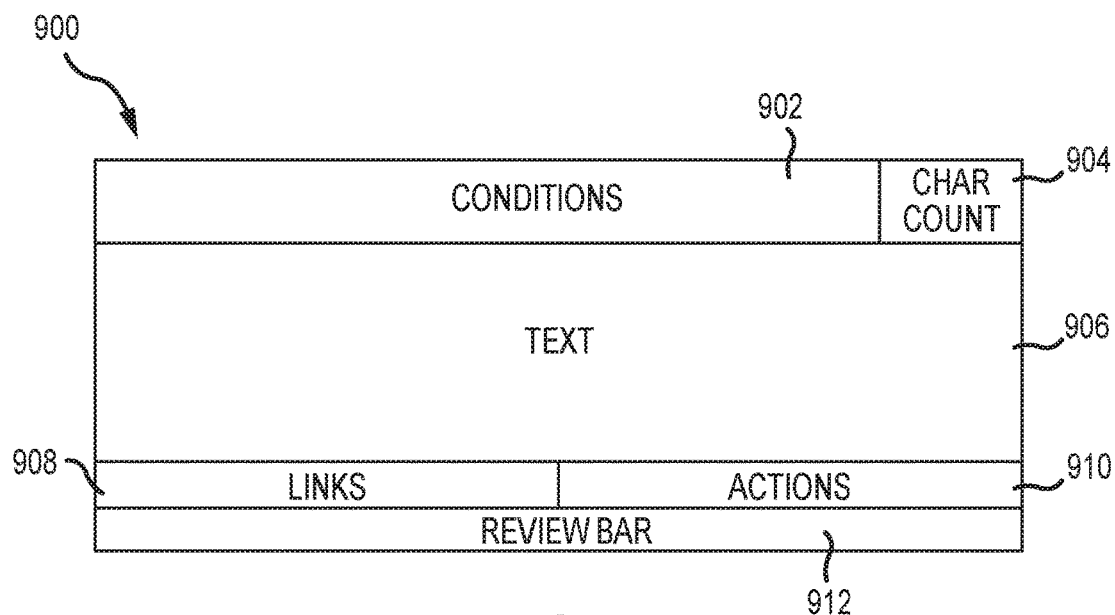
FIG. 19 is a simplified representation of a text block having a minimized review bar rendered therewith in accordance with an exemplary embodiment of the authoring tool.
Figure 20:
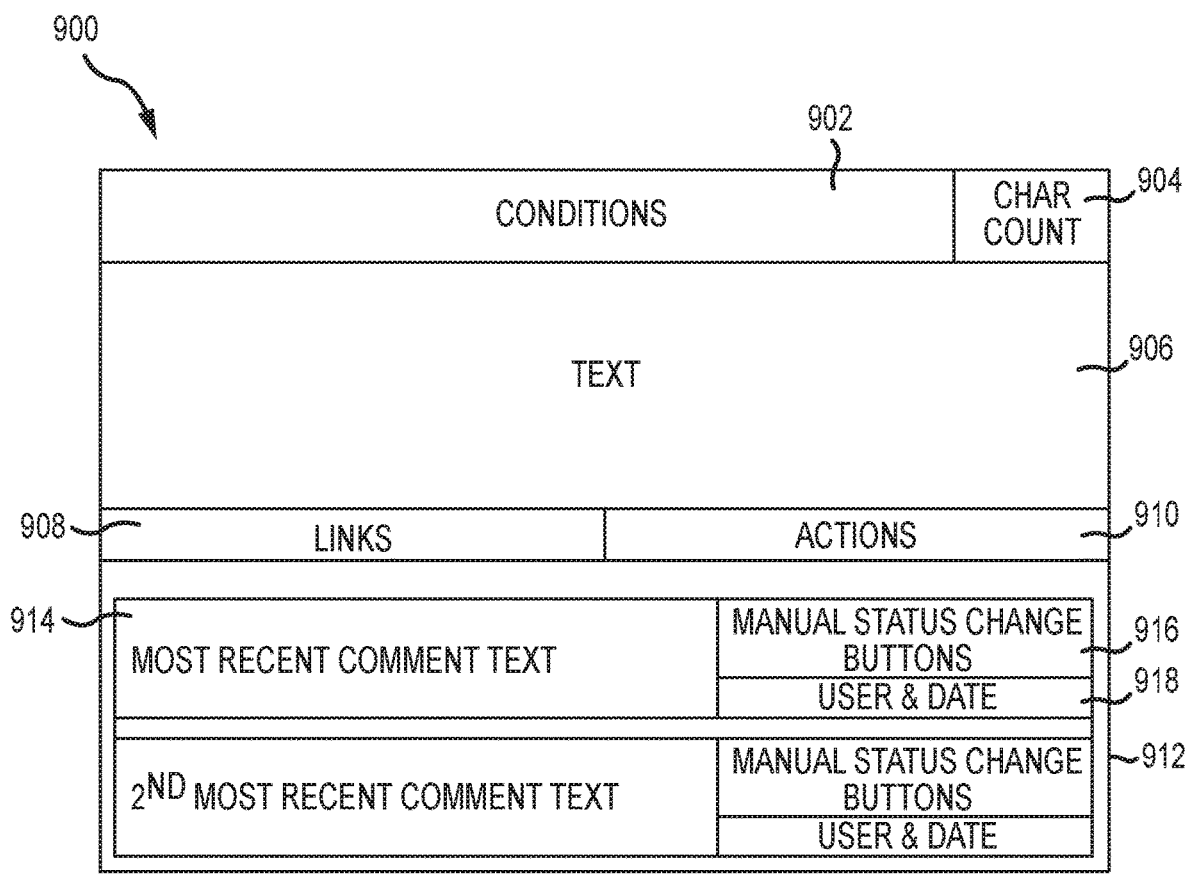
FIG. 20 is a simplified representation of a text block having an active and expanded review bar rendered therewith in accordance with an exemplary embodiment of the authoring tool.

When the review mode is active, an expandable review bar is rendered with text blocks. In this regard, FIG. 19 is a simplified representation of the text block 900 (also see FIG. 14) having a minimized review bar 912 rendered thereon. The review bar 912 is displayed in a minimized state by default. In certain embodiments, the review bar 912 is colored in accordance with the same scheme outlined above for passage commenting. Clicking the plus sign on the review bar 912 maximizes the review bar 912 to reveal additional details, as depicted in FIG. 20. When active and expanded, the review bar 912 includes regions corresponding to the most recent comment, the second most recent comment, and so on. The size of the review bar 912 window expands to accommodate all comments on the text block, and the window can be scrollable if needed to handle a large number of comments. Each comment region preferably includes the following items, without limitation: a comment text field 914; a manual status change buttons 916; and a user and date field 918.

The comment text field 914 contains the text content of the comment, as written by the creator of that comment. The manual status change buttons 916 can be activated to modify the comment status manually in the event that the automatic update status is not desired or is found to be erroneous. The user and date field 918 identifies the name of the user who wrote the comment, along with the date/time that the comment was saved. The date/time can be automatically updated to reflect revisions or edits to the comment as needed.

Debugging

The authoring tool can also include a debugging or demonstration feature that utilizes a test window for the testing of story content. Testing story content can be initiated by activating a "Debug Play" button on the review tab (or elsewhere within the UI of the authoring tool). Thereafter, the authoring tool loads the current chapter and opens a testing window. A "Show Flags" command can be activated to display the current flags and their respective values during debugging.

Use Case

The graphical authoring tool is preferably implemented as a suitably written software application that can be realized using computer-executable instructions stored on a memory element, computer-readable media, a hard disk, or the like. The executable instructions are configurable to be executed by one or more processors of the host computer-based system to cause that system to provide the authoring tool and support the various functions, features, commands, and operations described above. The authoring tool supports many functions that are conventional in nature and/or that are unrelated or unimportant to the fundamental narrative storyline authoring features. Accordingly, such secondary or peripheral features and functions are not described in detail in this section, which is a summary of a typical use case that involves an exemplary embodiment of the authoring tool.

The authoring tool can be launched for use on the host computing device or system, which initiates the tool and provides it on the display device of the host system. The story interface screen (see FIG. 10B for an example) is the default startup page/screen of the authoring tool. From the story interface screen, the user can create a new narrative storyline for uploading to a database system such as the NCDS, delete an existing story, edit an existing story, etc. This walkthrough assumes that the user wants to continue authoring or editing an existing story—the user double clicks one of the displayed stories to open the chapter interface screen for that story (see FIG. 11A for an example). From the chapter interface screen, the user can create a new chapter, delete an existing chapter, edit an existing chapter, rename a chapter, rearrange chapters, etc. This description assumes that the user wants to update or continue writing an existing chapter—the user double clicks on one of the displayed chapters to open the passage interface screen for the selected chapter (see FIG. 12B for an example).

As described above with reference to FIG. 12A and FIG. 12B, clicking or focusing on a passage displayed in the passage interface screen activates the edit pane 864 for that particular passage. The author creates one or more text blocks for the passage, wherein each text block represents a deliverable excerpt of text. A simple passage can include only one text block, which corresponds to only one possible deliverable message for that passage. A simple passage like this can be used for a purely narrative portion of the storyline, or for a point in the storyline where the same message content is delivered regardless of manner in which the reader arrived at the passage, and regardless of the current state of the storyline. In contrast, a more complex passage can include many different text blocks that contemplate different paths to the passage, different storyline states, whether or not certain conditions have been satisfied, and the like. As explained above, each text block can be individually configured with conditions, outgoing links, and/or actions as desired by the author.

This example assumes that the user has already manipulated the authoring tool to create at least two different passages that are to be linked together. Thus, the authoring tool receives the text content for a first passage of the narrative storyline, and the text content for a second passage of the narrative storyline. The text content for a passage can be entered in only one text block (for a simple passage) or entered in multiple text blocks and/or text groups. For simplicity, the following description relates to the creation of a link corresponding to one text block of the first passage, wherein the link causes the narrative storyline to progress from the first passage to the second passage. The user can select an Insert Link command to launch an insert link pop-up window 920, 950 and establish a link from the first passage to the second passage in the manner described above.

This example assumes that the authoring tool is manipulated to assign user personality trait characteristics to the link, wherein the user personality trait characteristics influence the personality trait profiles maintained by the database system for readers of the narrative storyline when the readers select the link to obtain the second passage. As mentioned above, the exemplary embodiment of the authoring tool allows the author to define the manner in which the link influences the reader's trait profile. More specifically, the insert link pop-up window 950 includes trait setting tools that can be adjusted by the author as needed to designate a suitable metric corresponding to the monitored personality traits.

The text block elements of the authoring tool also enable the author to define the applicable conditions and actions associated with each text block. Thus, the author has full control over the written text content, the manner in which each particular text string is chosen to be delivered to the reader, and how the reader's personality/trait profile is affected by the choices the reader makes during the progression of the narrative storyline. After the author has completed the narrative storyline, the review mode and/or the debugging mode can be utilized to check the storyline, the links, and overall flow of the story. Once the narrative storyline is finalized, the authoring tool can be manipulated to upload the data corresponding to the narrative storyline from the client device to the database system. In this regard, the uploaded data includes the text content and media (if any) for all chapters and passages, all links, and the user personality trait characteristics assigned to the links. The database system, e.g., the NCDS, stores and maintains the uploaded data, which can be revised as needed during an editing process if so desired. Eventually, the uploaded data for the narrative storyline is finalized for release to customers.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for authoring narrative storyline content, the method comprising:
   providing an authoring tool on a client device coupled to a database system;
   creating, by the authoring tool, a narrative storyline for uploading to the database system;
   receiving, by the authoring tool, text content for a first passage of the narrative storyline;
   receiving, by the authoring tool, text content for a second passage of the narrative storyline;
   establishing, by the authoring tool, a link from the first passage to the second passage;
   displaying an insert link window in association with the text content for the first passage, the insert link window facilitating the establishing of the link;
   assigning, by the authoring tool, reader personality trait characteristics to the link, wherein the reader personality trait characteristics influence updateable personality trait profiles maintained by the database system for readers of the narrative storyline when the readers select the link to obtain the second passage; and
   uploading data corresponding to the narrative storyline from the client device to the database system, the data comprising the text content for the first passage, the text content for the second passage, the link, and the reader personality trait characteristics assigned to the link;
   wherein the insert link window comprises a traits field to facilitate the assigning of the reader personality trait characteristics, the traits field having a plurality of trait setting tools, each of the trait setting tools corresponding to a different monitored personality trait of readers of the narrative storyline, and each of the trait setting tools comprising an adjustable slider having limits defined by different attributes of the respective personality trait.

2. The method of claim 1, wherein the link is associated with a user-initiated reply to a communicated storyline message that includes the text content for the first passage.

3. The method of claim 1, wherein the reader personality trait characteristics are indicative of behavioral or personality traits, attributes, or tendencies of a reader.

4. The method of claim 1, wherein the insert link window comprises:
   a link text field to indicate text to be displayed for the link; and
   a linked passage field to identify a name of the second passage.

5. The method of claim 1, wherein the trait setting tool comprises:

an attitude setting tool to designate an attitude trait setting having limits defined by an introvert attribute and an extrovert attribute;

an analysis setting tool to designate an analysis trait setting having limits defined by a logic attribute and an emotion attribute; or an approach setting tool to designate an approach trait having limits defined by a structured attribute and a spontaneous attribute.

6. A computer-based system comprising a memory element and a processor device communicatively coupled to the memory element, the memory element having computer-executable instructions stored thereon and configurable to be executed by the processor to cause the computer-based system to:

provide a graphical authoring tool on a display device of the computer-based system;

create a narrative storyline for uploading to a database system;

receive text content for a first passage of the narrative storyline, and text content for a second passage of the narrative storyline;

establish a link from the first passage to the second passage;

display an insert link window in association with the text content for the first passage, the insert link window facilitating the establishing of the link;

assign reader personality trait characteristics to the link, wherein the reader personality trait characteristics influence updateable personality trait profiles maintained by the database system for readers of the narrative storyline when the readers select the link to obtain the second passage; and upload data corresponding to the narrative storyline from the computer-based system to the database system, the data comprising the text content for the first passage, the text content for the second passage, the link, and the reader personality trait characteristics assigned to the link;

wherein the insert link window comprises a traits field to facilitate the assigning of the reader personality trait characteristics, the traits field having a plurality of trait setting tools, each of the trait setting tools corresponding to a different monitored personality trait of readers of the narrative storyline, and each of the trait setting tools comprising an adjustable slider having limits defined by different attributes of the respective personality trait.

7. The computer-based system of claim 6, wherein the link is associated with a user-initiated reply to a communicated storyline message that includes the text content for the first passage.

8. The computer-based system of claim 6, wherein the reader personality trait characteristics are indicative of behavioral or personality traits, attributes, or tendencies of a reader.

9. The computer-based system of claim 6, wherein the insert link window comprises:

a link text field to indicate text to be displayed for the link; and a linked passage field to identify a name of the second passage.

10. The computer-based system of claim 6, wherein the trait setting tool comprises:

an attitude setting tool to designate an attitude trait setting having limits defined by an introvert attribute and an extrovert attribute;

an analysis setting tool to designate an analysis trait setting having limits defined by a logic attribute and an emotion attribute; or an approach setting tool to designate an approach trait having limits defined by a structured attribute and a spontaneous attribute.

* * * * *